(12) United States Patent
Kurasawa

(10) Patent No.: US 10,558,297 B2
(45) Date of Patent: Feb. 11, 2020

(54) DETECTION DEVICE

(71) Applicant: Japan Display Inc., Tokyo (JP)

(72) Inventor: Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/545,702

(22) Filed: Aug. 20, 2019

(65) Prior Publication Data

US 2019/0369802 A1 Dec. 5, 2019

Related U.S. Application Data

(63) Continuation of application No. 16/359,624, filed on Mar. 20, 2019, now Pat. No. 10,402,010, which is a continuation of application No. 15/999,417, filed on Aug. 20, 2018, now Pat. No. 10,261,629, which is a continuation of application No. 15/063,994, filed on Mar. 8, 2016, now Pat. No. 10,082,901.

(30) Foreign Application Priority Data

Mar. 13, 2015 (JP) .................................. 2015-051381

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04112* (2013.01)

(58) Field of Classification Search
CPC .................. G06F 3/0412; G06F 3/044; G06F 2203/04102; G06F 2203/04103; G06F 2203/04111; G06F 2203/04112; G06F 3/041
See application file for complete search history.

(56) References Cited

U.S. PATENT DOCUMENTS

| | | |
|---|---|---|
| 2010/0214262 A1 | 8/2010 | Ishizaki et al. |
| 2011/0291966 A1 | 12/2011 | Takao et al. |
| 2013/0063371 A1 | 3/2013 | Lee et al. |
| 2013/0278528 A1 | 10/2013 | Ishizaki et al. |
| 2014/0055380 A1 | 2/2014 | Han et al. |

(Continued)

FOREIGN PATENT DOCUMENTS

| | | |
|---|---|---|
| CN | 103827794 | 5/2014 |
| CN | 203759663 | 8/2014 |

(Continued)

OTHER PUBLICATIONS

Japanese Office Action dated Jun. 26, 2018 in corresponding Japanese Application No. 2015-051381.

(Continued)

*Primary Examiner* — Bryan Earles
(74) *Attorney, Agent, or Firm* — K&L Gates LLP

(57) ABSTRACT

A detection device capable of detecting an external proximity object is provided. The detection device includes a substrate; and a plurality of thin conductive wires including: a plurality of first thin conductive wires each including a plurality of first thin wire pieces; and a plurality of second thin conductive wires each including a plurality of second thin wire pieces, the first thin wire pieces and the second thin wire pieces being made of a metal material and each including a first end portion and a second end portion.

12 Claims, 21 Drawing Sheets

(56) References Cited

U.S. PATENT DOCUMENTS

| | | |
|---|---|---|
| 2014/0060901 A1 | 3/2014 | Kim |
| 2014/0152580 A1 | 6/2014 | Weaver et al. |
| 2014/0292713 A1 | 10/2014 | Koito et al. |
| 2014/0293154 A1 | 10/2014 | Philipp |
| 2014/0293158 A1 | 10/2014 | Kurasawa et al. |
| 2014/0320760 A1 | 10/2014 | Ishizaki et al. |
| 2014/0360856 A1 | 12/2014 | Mizumoto et al. |
| 2014/0375903 A1 | 12/2014 | Westhues et al. |
| 2015/0015979 A1 | 1/2015 | Iwami et al. |
| 2015/0103276 A1 | 4/2015 | Ishizaki et al. |
| 2015/0103277 A1 | 4/2015 | Ishizaki et al. |
| 2015/0177878 A1 | 6/2015 | Cheng et al. |
| 2016/0018928 A1 | 1/2016 | Kurasawa et al. |
| 2016/0092004 A1 | 3/2016 | Yoshiki |
| 2016/0098120 A1 | 4/2016 | Miyake |
| 2016/0103509 A1 | 4/2016 | Yen |
| 2017/0115790 A1 | 4/2017 | Kurasawa et al. |

FOREIGN PATENT DOCUMENTS

| | | |
|---|---|---|
| CN | 104076997 | 10/2014 |
| JP | 2010-197576 A | 9/2010 |
| JP | 2014-041589 A | 3/2014 |
| JP | 2014-049114 A | 3/2014 |
| JP | 2014-191650 A | 10/2014 |
| JP | 2014-191660 A | 10/2014 |
| KR | 10-1111565 B1 | 2/2012 |
| KR | 10-2014-0118805 A | 10/2014 |

OTHER PUBLICATIONS

Notification of Reasons for Refusal (with English translation) dated Feb. 20, 2017 in corresponding Korean Application No. 10-2016-0028774. (8 pages).

Chinese Office Action dated Nov. 20, 2018 in corresponding Chinese Application No. 201610137619.6.

FIG.15

| EVALUATION EXAMPLE | FIRST END PORTION | TARGET POSITION | x | y | ANGLE WITH RESPECT TO PIXEL ARRAY DIRECTION | MOIRE EVALUATION |
|---|---|---|---|---|---|---|
| EVALUATION EXAMPLE 1 | P00 | P01 | 0 | 1 | 0.00 | POOR |
| EVALUATION EXAMPLE 2 | P00 | P15 | 1 | 5 | 11.31 | POOR |
| EVALUATION EXAMPLE 3 | P00 | P14 | 1 | 4 | 14.04 | POOR |
| EVALUATION EXAMPLE 4 | P00 | P13 | 1 | 3 | 18.43 | POOR |
| EVALUATION EXAMPLE 5 | P00 | P12 | 1 | 2 | 26.57 | POOR |
| EVALUATION EXAMPLE 6 | P00 | P35 | 3 | 5 | 30.96 | GOOD |
| EVALUATION EXAMPLE 7 | P00 | P23 | 2 | 3 | 33.69 | FAIR |
| EVALUATION EXAMPLE 8 | P00 | P34 | 3 | 4 | 36.87 | EXCELLENT |
| EVALUATION EXAMPLE 9 | P00 | P45 | 4 | 5 | 38.66 | EXCELLENT |
| EVALUATION EXAMPLE 10 | P00 | P56 | 5 | 6 | 39.81 | EXCELLENT |
| EVALUATION EXAMPLE 11 | P00 | P11 | 1 | 1 | 45.00 | POOR |
| EVALUATION EXAMPLE 12 | P00 | P65 | 6 | 5 | 50.19 | EXCELLENT |
| EVALUATION EXAMPLE 13 | P00 | P54 | 5 | 4 | 51.34 | EXCELLENT |
| EVALUATION EXAMPLE 14 | P00 | P43 | 4 | 3 | 53.13 | EXCELLENT |
| EVALUATION EXAMPLE 15 | P00 | P32 | 3 | 2 | 56.31 | FAIR |
| EVALUATION EXAMPLE 16 | P00 | P53 | 5 | 3 | 59.04 | GOOD |
| EVALUATION EXAMPLE 17 | P00 | P21 | 2 | 1 | 63.43 | POOR |
| EVALUATION EXAMPLE 18 | P00 | P31 | 3 | 1 | 71.57 | POOR |
| EVALUATION EXAMPLE 19 | P00 | P41 | 4 | 1 | 75.96 | POOR |
| EVALUATION EXAMPLE 20 | P00 | P51 | 5 | 1 | 78.69 | POOR |
| EVALUATION EXAMPLE 21 | P00 | P10 | 1 | 0 | 90.00 | POOR |

FIG.17

| EVALUATION EXAMPLE | FIRST END PORTION | TARGET POSITION | x | y | ANGLE WITH RESPECT TO PIXEL ARRAY DIRECTION | MOIRE EVALUATION |
|---|---|---|---|---|---|---|
| EVALUATION EXAMPLE 22 | Q00 | Q01 | 0 | 1 | 0.00 | POOR |
| EVALUATION EXAMPLE 23 | Q00 | Q15 | 1 | 5 | 14.93 | POOR |
| EVALUATION EXAMPLE 24 | Q00 | Q14 | 1 | 4 | 18.43 | POOR |
| EVALUATION EXAMPLE 25 | Q00 | Q13 | 1 | 3 | 23.96 | POOR |
| EVALUATION EXAMPLE 26 | Q00 | Q12 | 1 | 2 | 33.69 | POOR |
| EVALUATION EXAMPLE 27 | Q00 | Q35 | 3 | 5 | 38.66 | GOOD |
| EVALUATION EXAMPLE 28 | Q00 | Q23 | 2 | 3 | 41.63 | FAIR |
| EVALUATION EXAMPLE 29 | Q00 | Q34 | 3 | 4 | 45.00 | EXCELLENT |
| EVALUATION EXAMPLE 30 | Q00 | Q45 | 4 | 5 | 46.85 | EXCELLENT |
| EVALUATION EXAMPLE 31 | Q00 | Q56 | 5 | 6 | 48.01 | EXCELLENT |
| EVALUATION EXAMPLE 32 | Q00 | Q11 | 1 | 1 | 53.13 | POOR |
| EVALUATION EXAMPLE 33 | Q00 | Q65 | 6 | 5 | 57.99 | EXCELLENT |
| EVALUATION EXAMPLE 34 | Q00 | Q54 | 5 | 4 | 59.04 | EXCELLENT |
| EVALUATION EXAMPLE 35 | Q00 | Q43 | 4 | 3 | 60.64 | EXCELLENT |
| EVALUATION EXAMPLE 36 | Q00 | Q32 | 3 | 2 | 63.43 | FAIR |
| EVALUATION EXAMPLE 37 | Q00 | Q53 | 5 | 3 | 65.77 | GOOD |
| EVALUATION EXAMPLE 38 | Q00 | Q21 | 2 | 1 | 69.44 | POOR |
| EVALUATION EXAMPLE 39 | Q00 | Q31 | 3 | 1 | 75.96 | POOR |
| EVALUATION EXAMPLE 40 | Q00 | Q41 | 4 | 1 | 79.38 | POOR |
| EVALUATION EXAMPLE 41 | Q00 | Q51 | 5 | 1 | 81.47 | POOR |
| EVALUATION EXAMPLE 42 | Q00 | Q10 | 1 | 0 | 90.00 | POOR |

DETECTION DEVICE

CROSS-REFERENCE TO RELATED APPLICATIONS

The present application is a continuation of U.S. application Ser. No. 16/359,624, filed on Mar. 20, 2019, which is a continuation of U.S. application Ser. No. 15/999,417, filed on Aug. 20, 2018, and issued as U.S. Pat. No. 10,261,629 on Apr. 16, 2019, which is a continuation of U.S. application Ser. No. 15/063,994, filed on Mar. 8, 2016, and issued as U.S. Pat. No. 10,082,901 on Sep. 25, 2018, which claims priority from Japanese Application No. 2015-051381, filed on Mar. 13, 2015, the contents of which are incorporated by reference herein in its entirety.

BACKGROUND

1. Technical Field

The present invention relates to a detection device capable of detecting an external proximity object, and more particularly, to a detection device capable of detecting an external proximity object based on a change in capacitance, and a display device.

2. Description of the Related Art

In recent years, attention has been paid to a detection device referred to as a touch panel capable of detecting an external proximity object. The touch panel is mounted on or integrated with a display device such as a liquid crystal display device and is used for a display device with a touch detection function. The display device with a touch detection function displays various button images on the display device, thereby enabling input of information using the touch panel instead of ordinary mechanical buttons. The display device with a touch detection function, which includes such a touch panel, does not require an input device such as a keyboard, a mouse, and a keypad, and the use of the display device tends to increase in a portable information device such as a mobile phone as well as in a computer.

There are several types of touch detection methods, including an optical type, a resistance type, and a capacitance type. When a touch detection device of the capacitance type is used in a mobile device and the like, a device having a relatively simple structure and low power consumption can be provided. For example, Japanese Patent Application Laid-open Publication No. 2010-197576 (JP-A-2010-197576) discusses a touch panel in which a transparent electrode pattern is configured to be invisible.

Now, the detection devices capable of detecting an external proximity object are going to be formed to be thin, have a large screen, or have high precision, and accordingly, low resistance of detection electrodes is required. For the detection electrodes, as a material of transparent electrodes, a transparent conductive oxide such as indium tin oxide (ITO) is used. In order to configure the detection electrodes to have low resistance, a conductive material such as a metal material may be effectively used. However, when the conductive material such as the metal material is used, moire may be visually recognized due to interference between pixels of a display device and the conductive material such as the metal material.

Further, Japanese Patent Application Laid-open Publication No. 2014-041589 (JP-A-2014-041589) discusses a detection device capable of lowering a possibility of moire to be visually recognized even if a detection electrode made of a conductive material such as a metal material is used. Although the detection device discussed in JP-A-2014-041589 can lower the possibility of the moire to be visually recognized, when visible light is incident, a light intensity pattern, in which light is diffracted or scattered by a plurality of detection electrodes, becomes close to a pattern in which a plurality of points of light are scattered, and the points of light may be visually recognized.

SUMMARY

According to an aspect, a detection device is capable of detecting an external proximity object, and includes a substrate and a plurality of detection electrodes. The detection electrodes are each provided with a plurality of thin conductive wires having a plurality of first thin wire pieces and a plurality of second thin wire pieces which are electrically conducted with one another. Angles each of which is formed by an intersection between the first thin wire piece extending in a first direction and the second thin wire piece extending in a second direction different from the first direction included in the thin conductive wire, are constant, and a distance between the first thin wire pieces of different thin conductive wires is not constant.

BRIEF DESCRIPTION OF THE FIGURES

FIG. 15 is a table illustrating moire evaluation with respect to a display device with a touch detection function according to the first modification of the first embodiment;

FIG. 17 is a table illustrating moire evaluation with respect to a display device with a touch detection function according to the second modification of the first embodiment;

DETAILED DESCRIPTION

Figure 1:
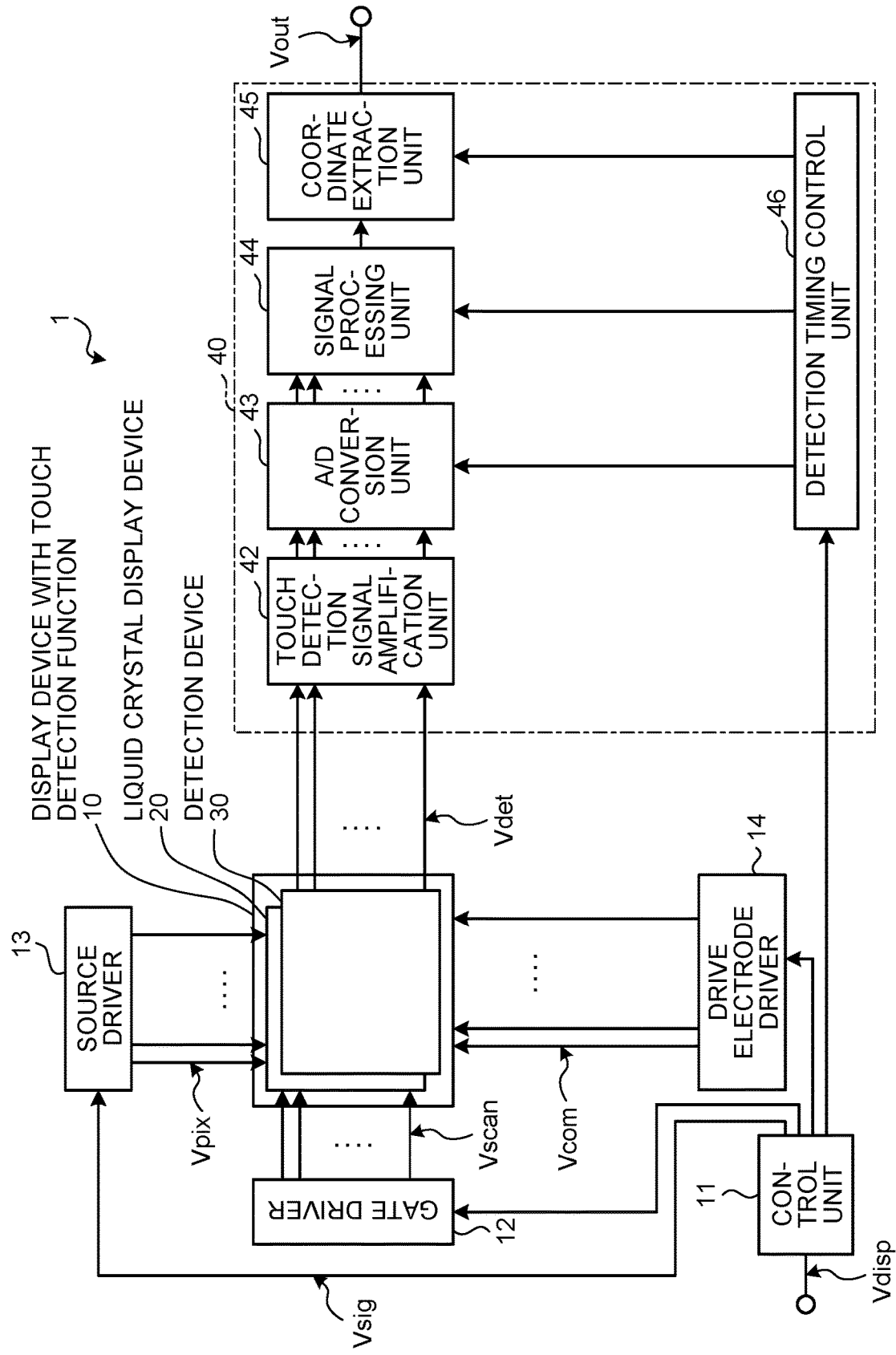
FIG. 1 is a block diagram illustrating a configuration example of a display device with a touch detection function according to a first embodiment.

The following describes embodiments of the present invention in detail with reference to the drawings. The present invention is not limited to the embodiments described below. Components described below include a component that is easily conceivable by those skilled in the art and substantially the same component. The components described below can be appropriately combined. The disclosure is merely an example, and the present invention naturally encompasses appropriate modifications maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same elements as those described in the drawings that have already been discussed are denoted by the same reference numerals throughout the description and the drawings, and detailed description thereof will not be repeated in some cases.

First Embodiment

FIG. 1 is a block diagram illustrating a configuration example of a display device with a touch detection function according to a first embodiment. An information processing device 1 is provided with a display device with a touch detection function 10, a control unit 11, a gate driver 12, a source driver 13, a drive electrode driver 14, and a touch detection unit 40. The display device with a touch detection function 10 is a device in which a liquid crystal display device 20 that uses a liquid crystal display element as a display element and a detection device 30 of the capacitance type are integrated with each other. The display device with a touch detection function 10 may be a device in which the detection device 30 of the capacitance type is mounted on the liquid crystal display device 20 that uses the liquid crystal display element as the display element. The liquid crystal display device 20 may be an organic electroluminescence (EL) display device, for example.

The liquid crystal display device 20 is a device that performs a display by sequentially scanning horizontal lines one by one according to a scan signal Vscan to be supplied from the gate driver 12 as will be described below. The control unit 11 is a circuit (control device) that supplies a control signal to each of the gate driver 12, the source driver 13, the drive electrode driver 14, and the touch detection unit 40 based on a video signal Vdisp supplied from the outside, and controls them so as to operate in a synchronized manner.

The gate driver 12 has a function of sequentially selecting one horizontal line that is a target of display drive for the display device with a touch detection function 10 based on a control signal supplied from the control unit 11.

The source driver 13 is a circuit that supplies a pixel signal Vpix to each subpixel SPix, which will be described below, of the display device with a touch detection function 10 based on a control signal Vsig supplied from the control unit 11.

The drive electrode driver 14 is a circuit that supplies a drive signal Vcom to a drive electrode COML, which will be described below, of the display device with a touch detection function 10 based on a control signal supplied from the control unit 11.

The touch detection unit 40 is a circuit that detects presence or absence of a touch (a contact state or proximity state which will be described below) on the detection device 30 based on a control signal supplied from the control unit 11 and a touch detection signal Vdet supplied from the detection device 30 of the display device with a touch detection function 10. When detecting that there is a touch, the touch detection unit 40 obtains coordinates thereof or the like in a touch detection area. The touch detection unit 40 is provided with a touch detection signal amplification unit 42, an A/D conversion unit 43, a signal processing unit 44, a coordinate extraction unit 45, and a detection timing control unit 46.

The touch detection signal amplification unit 42 amplifies the touch detection signal Vdet supplied from the detection device 30. The touch detection signal amplification unit 42 may be provided with a low-pass analog filter that eliminates a high-frequency component (noise component) included in the touch detection signal Vdet, and extracts and outputs a touch component.

Basic Principle of Touch Detection of Capacitance Type

Figure 2:
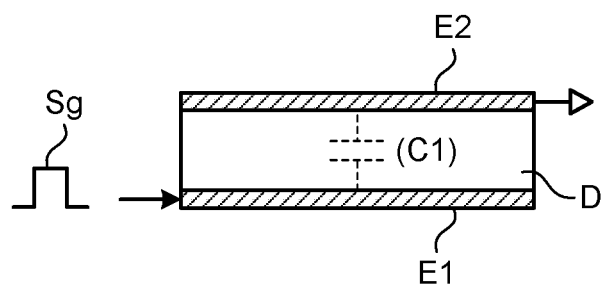
FIG. 2 is an explanatory diagram illustrating a state in which a finger is not in contact with or in proximity to a device in order to describe a basic principle of a touch detection method of a capacitance type.
Figure 3:
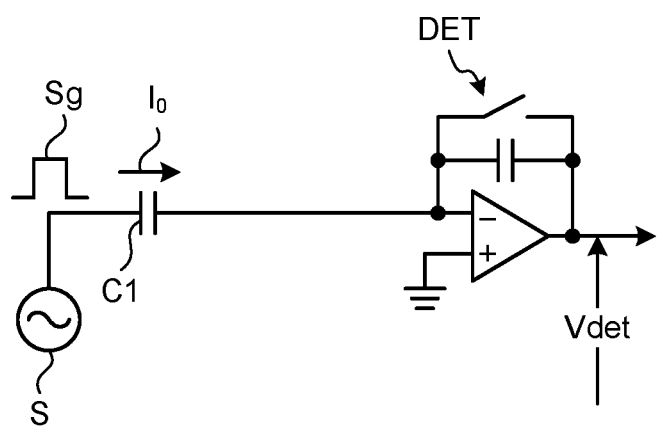
FIG. 3 is an explanatory diagram illustrating an example of an equivalent circuit in a state in which the finger is not in contact with or in proximity to the device as illustrated in FIG. 2.
Figure 4:
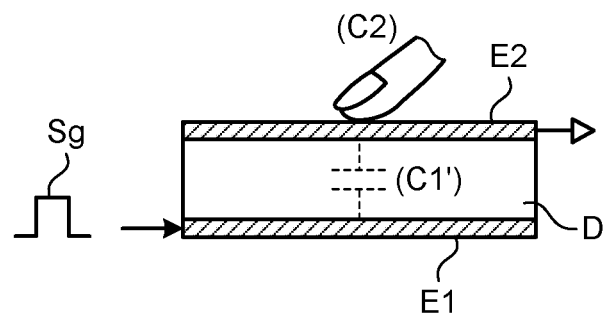
FIG. 4 is an explanatory diagram illustrating a state in which a finger is in contact with or in proximity to a device in order to describe a basic principle of the touch detection method of the capacitance type.
Figure 5:
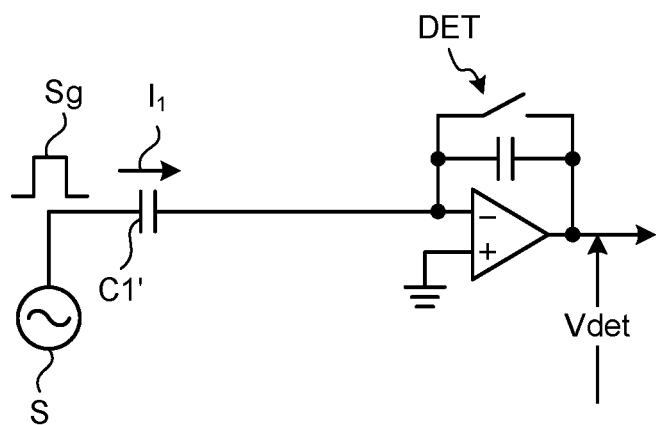
FIG. 5 is an explanatory diagram illustrating an example of an equivalent circuit in a state in which the finger is in contact with or in proximity to the device as illustrated in FIG. 4.
Figure 6:
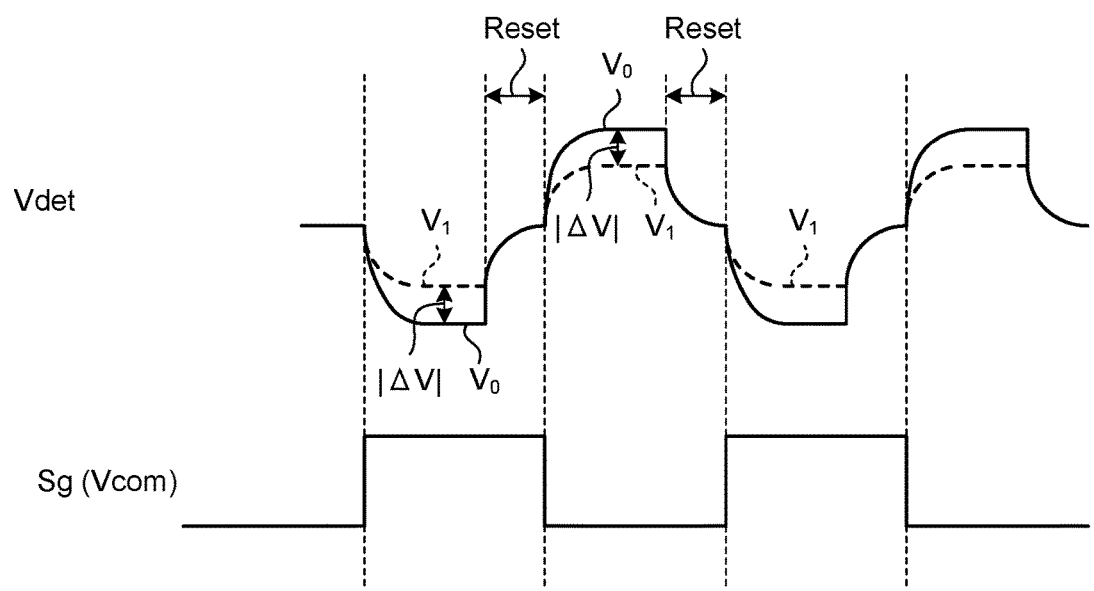
FIG. 6 is a diagram illustrating an example of waveforms of a drive signal and a touch detection signal.

The detection device 30 outputs the touch detection signal Vdet by operating based on the basic principle of touch detection of the capacitance type. The basic principle of touch detection in the display device with a touch detection function 10 according to the first embodiment will be described with reference to FIGS. 1 to 6. FIG. 2 is an explanatory diagram illustrating a state in which a finger is not in contact with or in proximity to a device in order to describe the basic principle of a touch detection method of the capacitance type. FIG. 3 is an explanatory diagram illustrating an example of an equivalent circuit in a state in which the finger is not in contact with or in proximity to the device as illustrated in FIG. 2. FIG. 4 is an explanatory diagram illustrating a state in which a finger is in contact with or in proximity to a device in order to describe the basic principle of the touch detection method of the capacitance type. FIG. 5 is an explanatory diagram illustrating an example of an equivalent circuit in a state in which the finger is in contact with or in proximity to the device as illustrated in FIG. 4. FIG. 6 is a diagram illustrating an example of waveforms of the drive signal and the touch detection signal.

As illustrated in FIGS. 2 and 4, capacitive elements C1 and C1' include a pair of electrodes, i.e., a drive electrode E1 and a detection electrode E2 which are arranged to oppose each other with a dielectric D interposed therebetween, for example. As illustrated in FIG. 3, the capacitive element C1 has one end being coupled to an AC signal source (drive signal source) S, and the other end being coupled to a voltage detector (touch detection unit) DET. The voltage detector DET is an integration circuit included in the touch detection signal amplification unit 42 illustrated in FIG. 1, for example.

When an AC rectangular wave Sg having a predetermined frequency (for example, about several kHz to several hundreds kHz) is applied to the drive electrode E1 (one end of the capacitive element C1) from the AC signal source S, an output waveform (the touch detection signal Vdet) appears via the voltage detector DET coupled to the detection electrode E2 (the other end of the capacitive element C1). This AC rectangular wave Sg corresponds to a touch drive signal Vcomt which will be described below.

In a state in which the finger is not in contact with (or in proximity to) a device (i.e., a non-contact state), current $I_0$ according to a capacitance value of the capacitive element C1 flows in accordance with charging and discharging of the capacitive element C1 as illustrated in FIGS. 2 and 3. As illustrated in FIG. 6, the voltage detector DET converts a variation in the current $I_0$ according to the AC rectangular wave Sg into a variation in voltage (a waveform $V_0$ of the solid line).

On the other hand, in a state in which a finger is in contact with (or in proximity to) a device (i.e., the contact state), a capacitance C2 formed by the finger is in contact with or in proximity to the detection electrode E2. As a result, a fringe capacitance between the drive electrode E1 and the detection electrode E2 is eliminated, and the capacitive element C1' having a smaller capacitance value than that of the capacitive element C1 is generated as illustrated in FIG. 4. Further, current $I_1$ flows in the capacitive element C1' when seen from the equivalent circuit illustrated in FIG. 5. As illustrated in FIG. 6, the voltage detector DET converts a variation in the current $I_1$ according to the AC rectangular wave Sg, into a variation in voltage (a waveform $V_1$ of the dotted line). In this case, the waveform $V_1$ has a smaller amplitude as compared to the waveform $V_0$ described above. Accordingly, an absolute value $|\Delta V|$ of a voltage difference between the waveform $V_0$ and the waveform $V_1$ is changed according to influence by an object which approaches from the outside such as a finger. More preferably, the voltage detector DET performs an operation with a period "Reset" to reset charging and discharging of the capacitor in accordance with a frequency of the AC rectangular wave Sg by performing switching inside a circuit, so as to accurately detect the absolute value $|\Delta V|$ of the voltage difference between the waveform $V_0$ and the waveform $V_1$.

The detection device 30 illustrated in FIG. 1 is configured to perform the touch detection by sequentially scanning detection blocks one by one according to the drive signal Vcom (the touch drive signal Vcomt which will be described below) supplied from the drive electrode driver 14.

The detection device 30 is configured to output the touch detection signal Vdet for each detection block via the voltage detector DET illustrated in FIGS. 3 and 5 from a plurality of detection electrodes TDL, which will be described below, and supplies the touch detection signal Vdet to the A/D conversion unit 43 of the touch detection unit 40.

The A/D conversion unit 43 is a circuit that samples an analog signal, which is output from the touch detection signal amplification unit 42, and converts the sampled analog signal to a digital signal at a timing synchronized with the drive signal Vcom.

The signal processing unit 44 is provided with a digital filter that reduces a frequency component (noise component), other than a frequency with which the drive signal Vcom is sampled, included in an output signal of the A/D conversion unit 43. The signal processing unit 44 is a logic circuit that detects presence or absence of a touch on the detection device 30 based on the output signal of the A/D conversion unit 43. The signal processing unit 44 performs a process of extracting only a difference voltage generated by a finger. This difference voltage generated by the finger is the absolute value $|\Delta V|$ of the difference between the waveform $V_0$ and the waveform $V_1$ described above. The signal processing unit 44 may obtain an average value of the absolute values $|\Delta V|$ by performing calculation to average the absolute values $|\Delta V|$ per one detection block. Accordingly, the signal processing unit 44 can reduce influence caused by the noise. The signal processing unit 44 compares the detected difference voltage generated by the finger with a predetermined threshold voltage. When the detected difference voltage is equal to or higher than the threshold voltage, the signal processing unit 44 determines that an external proximity object approaching from the outside is in the contact state. When the detected difference voltage is lower than the threshold voltage, the signal processing unit 44 and determines that the external proximity object is in the non-contact state. In this manner, the touch detection unit 40 can detect a touch.

The coordinate extraction unit 45 is a logic circuit that obtains touch panel coordinates of a touch when the touch is detected in the signal processing unit 44. The detection timing control unit 46 performs control such that the A/D conversion unit 43, the signal processing unit 44, and the coordinate extraction unit 45 operate in a synchronized manner. The coordinate extraction unit 45 outputs the touch panel coordinates as a signal output Vout.

Module

Figure 7:
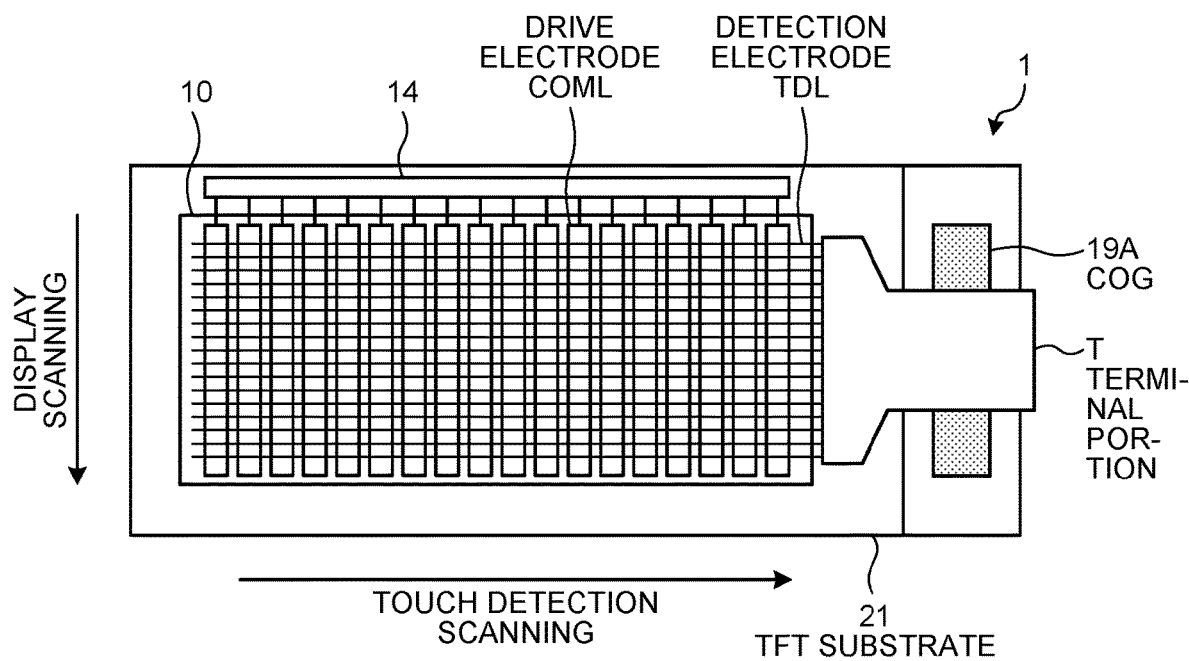
FIG. 7 is a diagram illustrating an example of a module to which the display device with a touch detection function is mounted.
Figure 8:
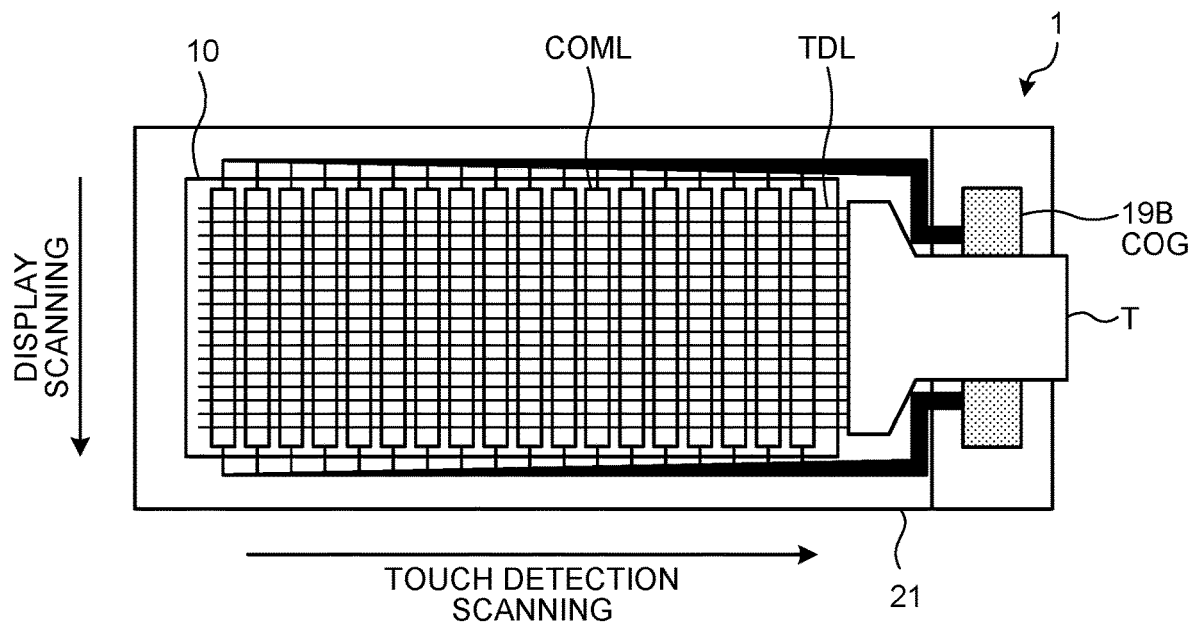
FIG. 8 is a diagram illustrating an example of a module to which the display device with a touch detection function is mounted.

FIGS. 7 and 8 are diagrams each illustrating an example of a module to which the display device with a touch detection function is mounted. As illustrated in FIG. 7, the information processing device 1 may include the above-described drive electrode driver 14 provided on a thin film transistor (TFT) substrate 21, which is a glass substrate, when the display device with a touch detection function is mounted to the module.

As illustrated in FIG. 7, the information processing device 1 includes the display device with a touch detection function 10, the drive electrode driver 14, and a chip on glass (COG) 19A. As schematically illustrated in FIG. 7, the display device with a touch detection function 10 includes the drive electrode COML and the detection electrode TDL formed so as to three-dimensionally cross the drive electrode COML in a direction perpendicular to a surface of a TFT substrate 21 which will be described below. More specifically, the drive electrode COML is formed in a direction along one side of the display device with a touch detection function 10, and the detection electrode TDL is formed in a direction along the other side of the display device with a touch detection function 10. An output terminal of the detection electrode TDL is provided on the other side of the display device with a touch detection function 10, and is coupled to the touch detection unit 40 mounted outside of the module via a terminal portion T which is formed using a flexible substrate or the like. The drive electrode driver 14 is formed on the TFT substrate 21 which is the glass substrate. A COG 19A is a chip which is mounted to the TFT substrate 21, and incorporates various circuits required for a display operation such as the control unit 11, the gate driver 12, or the source driver 13 illustrated in FIG. 1. As illustrated in FIG. 8, the information processing device 1 may include the drive electrode driver 14 which is built in the chip on glass (COG).

As illustrated in FIG. 8, the module of the information processing device 1 includes a COG 19B. The COG 19B illustrated in FIG. 8 incorporates the drive electrode driver 14 in addition to the above-described various circuits required for the display operation. The information processing device 1 sequentially scans each one horizontal line at the time of the display operation which will be described below. More specifically, the information processing device 1 performs display scanning in a direction parallel to one side of the display device with a touch detection function 10. On the other hand, the information processing device 1 sequentially scans each one detection line by sequentially applying the drive signal Vcom to each drive electrode COML at the time of a touch detection operation. More specifically, the information processing device 1 performs touch detection scanning in a direction parallel to the other side of the display device with a touch detection function 10.

Display Device with a Touch Detection Function

Figure 9:
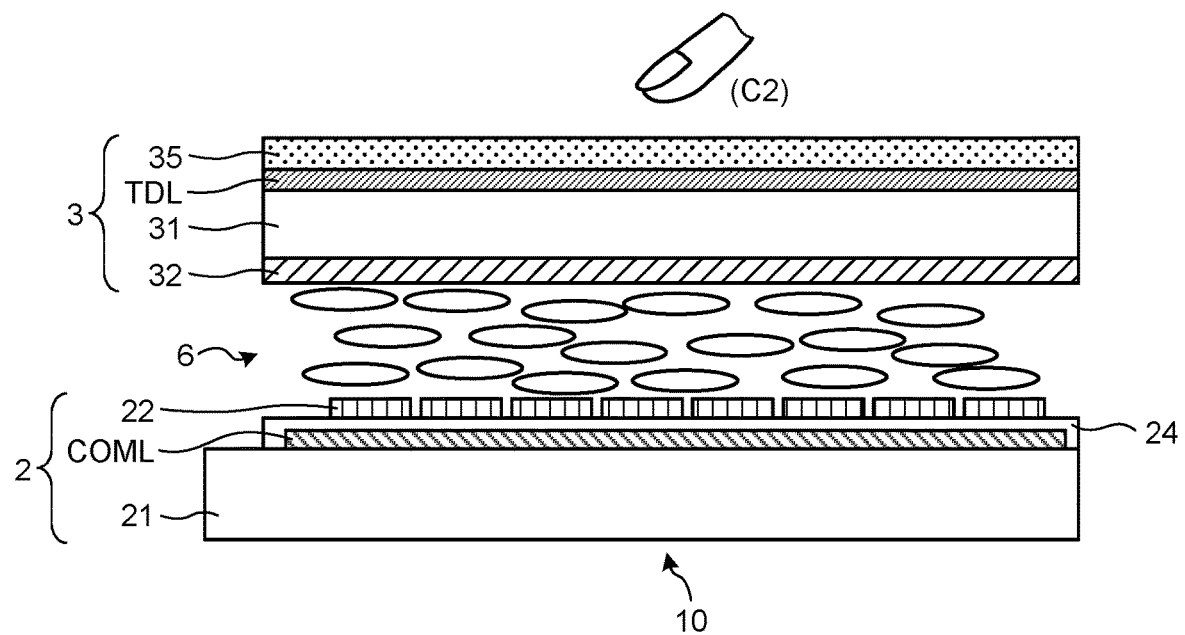
FIG. 9 is a cross-sectional view illustrating a schematic cross-sectional structure of the display device with a touch detection function according to the first embodiment.
Figure 10:
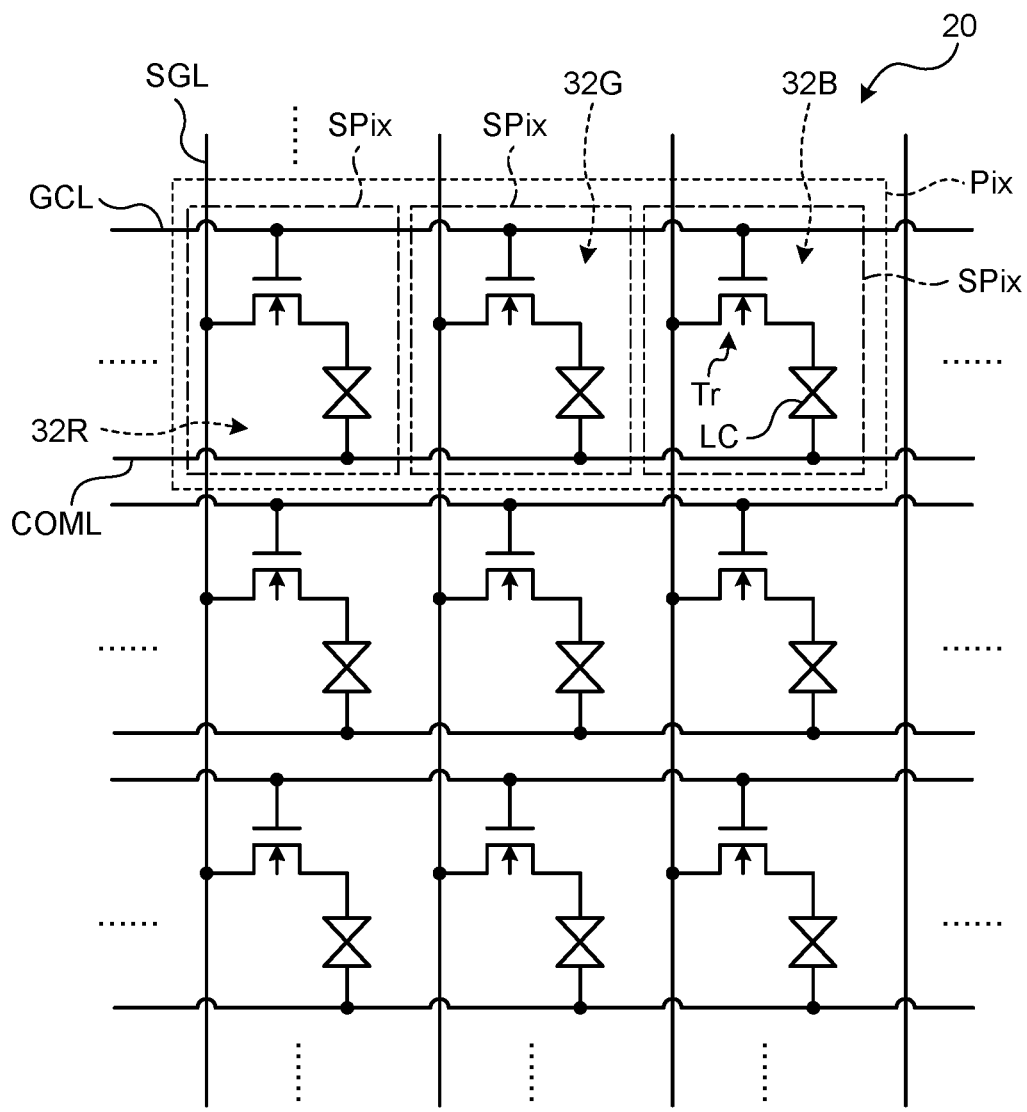
FIG. 10 is a circuit diagram illustrating a pixel array of the display device with a touch detection function according to the first embodiment.

Next, a configuration example of the display device with a touch detection function 10 will be described in detail below. FIG. 9 is a cross-sectional view illustrating a schematic cross-sectional structure of the display device with a touch detection function according to the first embodiment. FIG. 10 is a circuit diagram illustrating a pixel array of the display device with a touch detection function according to the first embodiment. The display device with a touch detection function 10 is provided with a pixel substrate 2, a counter substrate 3 that is arranged so as to oppose the pixel substrate 2 in a direction perpendicular to the surface of the pixel substrate 3, and a liquid crystal layer 6 that is interposed between the pixel substrate 2 and the counter substrate 3.

The pixel substrate 2 includes the TFT substrate 21 as a circuit substrate, a plurality of pixel electrodes 22 disposed on the TFT substrate 21 in a matrix, a plurality of the drive electrodes COML formed between the TFT substrate 21 and the pixel electrodes 22, and an insulating layer 24 that insulates the pixel electrodes 22 from the drive electrodes COML. On the TFT substrate 21, a thin film transistor (TFT) element Tr of each subpixel SPix illustrated in FIG. 10, and wirings such as a signal line SGL supplying the pixel signal Vpix to each pixel electrode 22 illustrated in FIG. 9, and a scan line GCL driving each TFT element Tr are formed. In this manner, the signal lines SGL extend on a plane parallel to the surface of the TFT substrate 21, and supply the pixel signal Vpix used for displaying an image in the pixels. The liquid crystal display device 20 illustrated in FIG. 10 has a plurality of subpixels SPix arranged in a matrix. Each of the subpixel SPix includes the TFT element Tr and a liquid crystal element LC. The TFT element Tr is configured by a thin film transistor and, in this example, is configured by a TFT of the n-channel metal oxide semiconductor (MOS) type. One of a source and a drain of the TFT element Tr is coupled to the signal line SGL, a gate is coupled to the scan line GCL, and the other of the source and the drain is coupled to one end of the liquid crystal element LC. The liquid crystal element LC has one end coupled to the drain of the TFT element Tr, and the other end coupled to the drive electrode COML, for example.

As illustrated in FIG. 10, a subpixel SPix and another subpixel belonging to the same row of the liquid crystal display device 20 are coupled to each other by the scan line GCL. The scan line GCL is coupled to the gate driver 12, and is supplied with the scan signal Vscan from the gate driver 12. A subpixel SPix and another subpixel Spix belonging to the same column of the liquid crystal display device 20 are coupled to each other by the signal line SGL. The signal line SGL is coupled to the source driver 13, and is supplied with the pixel signal Vpix from the source driver 13. Further, the subpixel SPix and another subpixel Spix belonging to the same row of the liquid crystal display device 20 are coupled to each other by the drive electrode COML. The drive electrode COML is coupled to the drive electrode driver 14, and is supplied with the drive signal Vcom from the drive electrode driver 14. In other words, in this example, a plurality of subpixels SPix that belong to the same row are configured to share one drive electrode COML. An extending direction of the drive electrode COML according to the first embodiment is parallel to an extending direction of the scan line GCL. The extending direction of the drive electrode COML according to the first embodiment is not limited thereto, and may be a direction parallel to an extending direction of the signal line SGL, for example.

The gate driver 12 illustrated in FIG. 1 sequentially selects one row (one horizontal line) from among the subpixels SPix formed in a matrix in the liquid crystal display device 20 as a target of the display drive by applying the scan signal Vscan to the gate of the TFT element Tr of the pixel Pix via the scan line GCL illustrated in FIG. 10. The source driver 13 illustrated in FIG. 1 supplies the pixel signal Vpix to each of the subpixels SPix configuring one horizontal line, which is sequentially selected by the gate driver 12 via the signal line SGL illustrated in FIG. 10. Further, these subpixels SPix display one horizontal line in accordance with the supplied pixel signal Vpix. The drive electrode driver 14 illustrated in FIG. 1 applies the drive signal Vcom, thereby driving the drive electrodes COML for each block that is configured by a predetermined number of the drive electrodes COML illustrated in FIGS. 7 and 8.

As described above, in the liquid crystal display device 20, one horizontal line is sequentially selected as the gate driver 12 performs driving such that line sequential scanning is performed in a time division manner. Further, in the liquid crystal display device 20, the source driver 13 supplies the pixel signal Vpix to the subpixels SPix belonging to one horizontal line, whereby each one horizontal line is displayed. When this display operation is performed, the drive electrode driver 14 is configured to apply the drive signal Vcom to a block including the drive electrodes COML corresponding to the one horizontal line.

Figure 11:
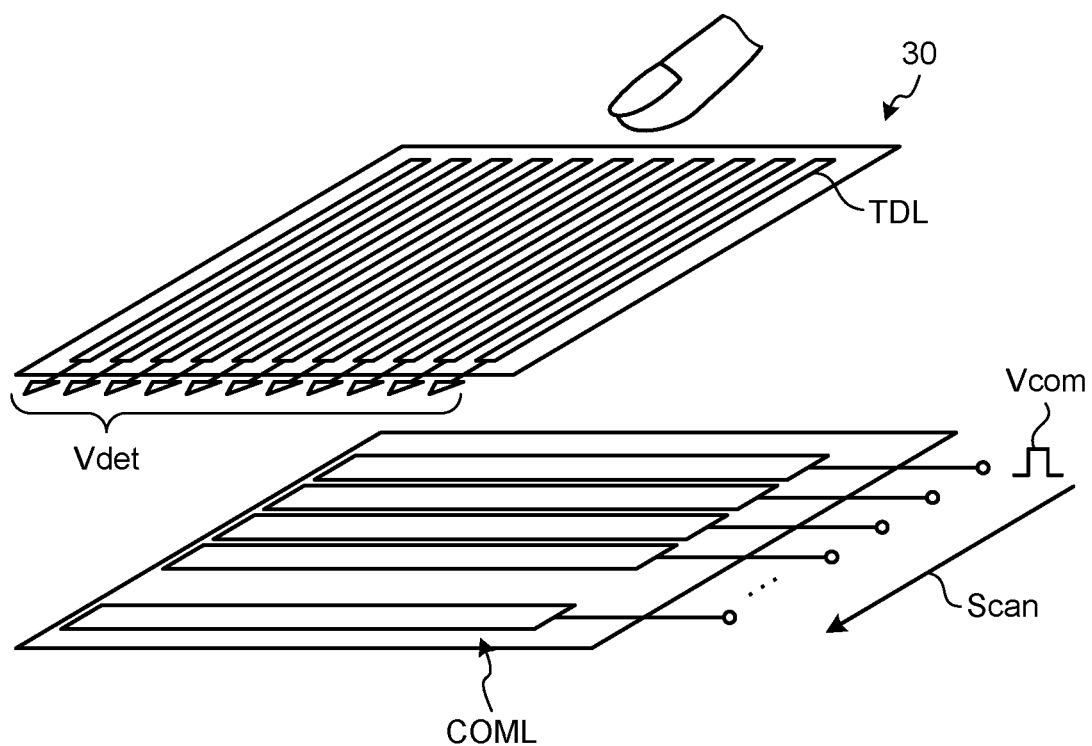
FIG. 11 is a perspective view illustrating each configuration example of drive electrodes and detection electrodes of the display device with a touch detection function according to the first embodiment.

The drive electrode COML according to the first embodiment serves not only as a drive electrode of the liquid crystal display device 20 but also as a drive electrode of the detection device 30. FIG. 11 is a perspective view illustrating a configuration example of the drive electrodes and the detection electrodes of the display device with a touch detection function according to the first embodiment. The drive electrodes COML illustrated in FIG. 11 oppose the pixel electrodes 22 in a direction perpendicular to the surface of the TFT substrate 21 as illustrated in FIG. 9. The detection device 30 is configured by the drive electrodes COML provided in the pixel substrate 2 and the detection electrodes TDL provided in the counter substrate 3. The detection electrodes TDL are configured by stripe-shaped electrode patterns extending in a direction intersecting with the extending direction of the electrode patterns of the drive electrodes COML. Further, the detection electrodes TDL oppose the drive electrodes COML in the direction perpendicular to the surface of the TFT substrate 21. Each electrode pattern of the detection electrode TDL is coupled to an input terminal of the touch detection signal amplification unit 42 of the touch detection unit 40. The electrode patterns intersecting each other formed by the drive electrodes COML and the detection electrodes TDL generate electrostatic capacitance in each of the intersecting portions thereof. The detection electrode TDL or the drive electrode COML (drive electrode block) is not limited to a stripe-shaped electrode which is divided in plural. For example, the detection electrode TDL or the drive electrode COML (drive electrode block) may have a comb tooth shape. Alternatively, the detection electrode TDL or the drive electrode COML (drive electrode block) may have any shape as long as being divided in plural. A shape of a slit that divides the drive electrode COML may be a straight line or may be a curved line. The detection electrodes TDL may three-dimensionally cross or oppose the drive electrodes COML in a direction perpendicular to the surface of the TFT substrate 21. Thus, the detection electrodes TDL may be provided in a substrate different from the counter substrate 3.

By employing such a configuration, in the detection device 30, when the touch detection operation is performed, the drive electrode driver 14 drives the drive electrodes COML as a drive electrode block in a time division manner so as to perform line sequential scanning, and accordingly, each detection block of the drive electrode COML is sequentially selected in a scan direction "Scan". Then, the touch detection signal Vdet is output from the detection electrode TDL. In this manner, the detection device 30 is configured to perform touch detection of one detection block. In other words, the drive electrode block corresponds to the drive electrode E1 in the basic principle of the touch detection described above, the detection electrode TDL corresponds to the detection electrode E2, and the detection device 30 is configured to detect a touch according to the basic principle. As illustrated in FIG. 11, the electrode patterns intersecting with each other configures touch sensors of the capacitance type in a matrix. Accordingly, by scanning the whole touch detection face of the touch detection device 30, a position at which an external object is in contact with or in proximity to the touch detection face can be detected as well.

The liquid crystal layer 6 is configured to modulate light that passes therethrough in accordance with the state of electric fields thereof. In the liquid crystal layer 6, a liquid crystal display device that uses a liquid crystal of a horizontal electric field mode such as a fringe field switching (FFS) or an in-plane switching (IPS) may be employed. An orientation film may be respectively arranged between the liquid crystal layer 6 and the pixel substrate 2, and between the liquid crystal layer 6 and the counter substrate 3 illustrated in FIG. 9.

The counter substrate 3 includes a glass substrate 31 and a color filter 32 formed on one face of the glass substrate 31. The detection electrodes TDL that are detection electrodes of the detection device 30 are formed on the other face of the glass substrate 31, and further, a polarizing plate 35 is disposed on the detection electrodes TDL.

In the color filter 32 illustrated in FIG. 9, color areas of a color filter colored in three colors of red (R), green (G) and blue (B), for example, are cyclically arranged, and color areas 32R, 32G and 32B (see FIG. 10) corresponding to the three colors of R, G and B are associated with the respective subpixels SPix illustrated in FIG. 10. Thus, the pixel Pix is configured by a set of the color areas 32R, 32G and 32B. The pixels Pix are arranged in a matrix in a direction parallel to the scan lines GCL and a direction parallel to the signal lines SGL, and form a display area Ad which will be described below. The color filter 32 opposes the liquid crystal layer 6 in a direction perpendicular to the TFT substrate 21. In this manner, each subpixel SPix can display a single color. If the color filter 32 is colored in different colors, color combinations other than the above may be employed. The color filter 32 may not be provided. There may be an area in which the color filter 32 is not provided, i.e., a subpixel SPix which is not colored.

Subsequently, an operation and action of the display device with a touch detection function 10 according to the first embodiment will be described.

Since the drive electrode COML serves both as a common drive electrode of the liquid crystal display device 20 and as a drive electrode of the detection device 30, there is a possibility that the drive signals Vcom influence each other. Accordingly, the drive signal Vcom is applied to the drive electrode COML separately in a display period B during which a display operation is performed and in a touch detection period A during which a touch detection operation is performed. In the display period B in which the display operation is performed, the drive electrode driver 14 applies the drive signal Vcom as a display drive signal. On the other hand, in the touch detection period A in which the touch detection operation is performed, the drive electrode driver 14 applies the drive signal Vcom as a touch drive signal. In the following description, the drive signal Vcom as a display drive signal will be referred to as a display drive signal Vcomd, and the drive signal Vcom as a touch drive signal will be referred to as a touch drive signal Vcomt.

The control unit 11 supplies control signals to the gate driver 12, the source driver 13, the drive electrode driver 14, and the touch detection unit 40 based on the video signal Vdisp supplied from the outside, thereby performing control such that these units operate in a synchronized manner. In the display period B, the gate driver 12 supplies the scan signal Vscan to the liquid crystal display device 20, thereby sequentially selecting one horizontal line as a target of the display drive. In the display period B, the source driver 13 supplies the pixel signal Vpix to each of pixels Pix configuring one horizontal line selected by the gate driver 12.

In the display period B, the drive electrode driver 14 applies the display drive signal Vcomd to a drive electrode block relating to one horizontal line, and in the touch detection period A, the drive electrode driver 14 sequentially applies the touch drive signal Vcomt to a drive electrode block relating to the touch detection operation, thereby sequentially selecting one detection block. In the display period B, the display device with a touch detection function 10 performs the display operation based on signals supplied by the gate driver 12, the source driver 13, and the drive electrode driver 14. In the touch detection period A, the display device with a touch detection function 10 performs the touch detection operation based on a signal supplied by the drive electrode driver 14 and outputs the touch detection signal Vdet from the detection electrode TDL. The touch detection signal amplification unit 42 amplifies and outputs the touch detection signal Vdet. The A/D conversion unit 43 converts an analog signal output from the touch detection signal amplification unit 42 into a digital signal at timing synchronized with the touch drive signal Vcomt. The signal processing unit 44 detects presence or absence of a touch on the detection device 30 based on the output signal of the A/D conversion unit 43. When touch detection is made by the signal processing unit 44, the coordinate extraction unit 45 obtains touch panel coordinates thereof.

Figure 12:
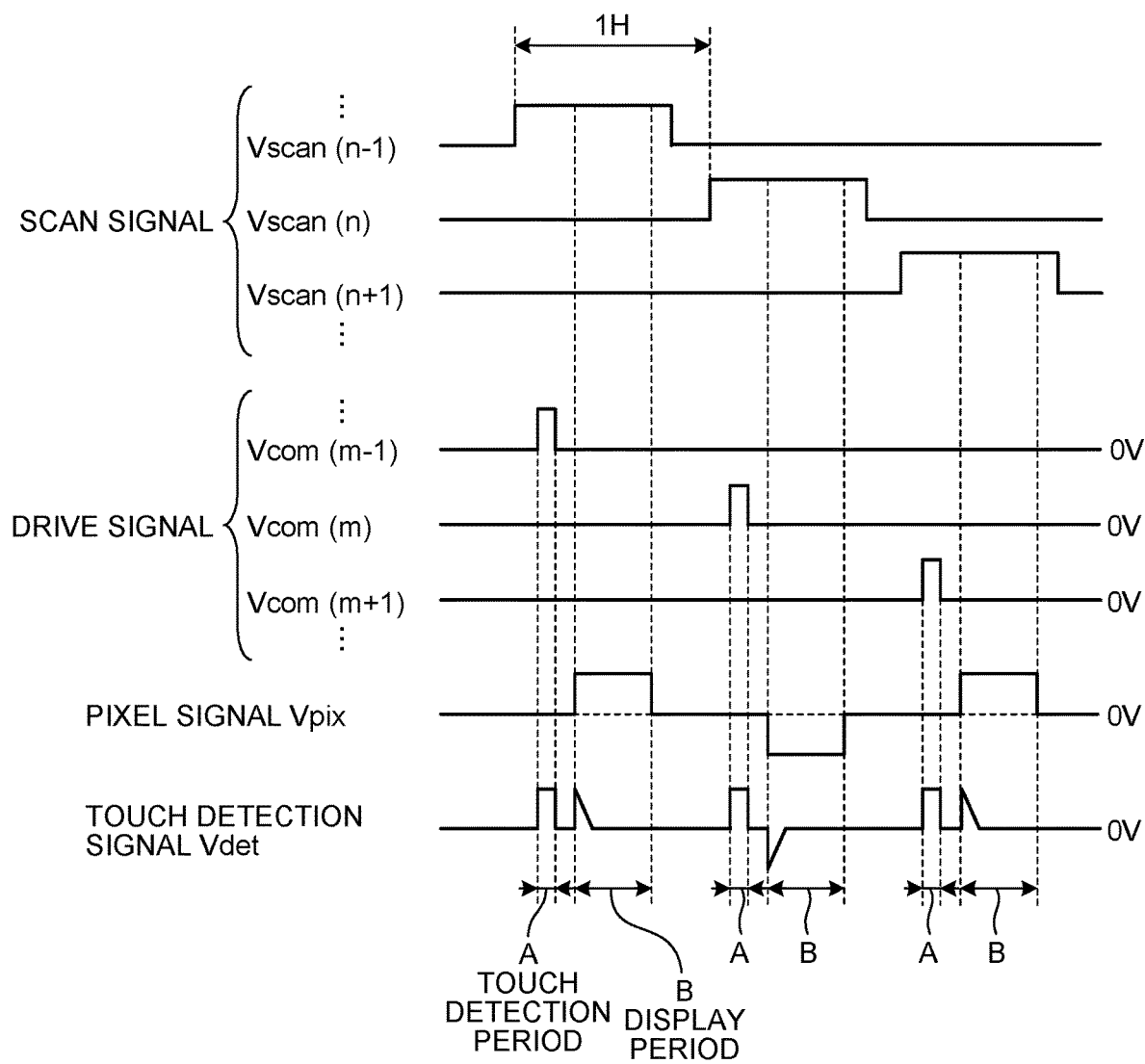
FIG. 12 is a timing waveform chart illustrating an operation example of the display device with a touch detection function according to the first embodiment.

Next, a detailed operation of the display device with a touch detection function 10 will be described. FIG. 12 is a timing waveform chart illustrating an operation example of the display device with a touch detection function according to the first embodiment. As illustrated in FIG. 12, the liquid crystal display device 20 performs a display by sequentially scanning each one horizontal line of the scan lines GCL in order of the (n−1)-th row, the n-th row adjacent thereto, and the (n+1)-th row adjacent thereto out of the scan lines GCL according to the scan signal Vscan supplied from the gate driver 12. Similarly, the drive electrode driver 14 sequentially supplies the drive signal Vcom to the drive electrodes COML in order of the (m−1)-th column, the m-th column adjacent thereto, and the (m+1)-th column adjacent thereto out of the drive electrodes COML of the display device with a touch detection function 10 based on a control signal supplied from the control unit 11.

As described above, in the display device with a touch detection function 10, the touch detection operation (the touch detection period A) and the display operation (the display period B) are performed in a time division manner for each display horizontal period (1H). In the touch detection operation, scanning for touch detection is performed by selecting a different drive electrode COML and applying the drive signal Vcom to the selected drive electrode for each one display horizontal period 1H. The operation will be described in detail below.

First, the gate driver 12 applies the scan signal Vscan to the scan line GCL of the (n−1)-th row, whereby the scan signal Vscan(n−1) is changed from a low level to a high level. Accordingly, one display horizontal period 1H is initiated.

Next, in the touch detection period A, the drive electrode driver 14 applies the drive signal Vcom to the drive electrode COML of the (m−1)-th column, whereby the drive signal Vcom(m−1) is changed from a low level to a high level. This drive signal Vcom(m−1) is transmitted to the detection electrode TDL through an electrostatic capacitance, whereby the touch detection signal Vdet is changed. Then, when the drive signal Vcom(m−1) is changed from the high level to the low level, the touch detection signal Vdet is changed in the same manner. The waveform of the touch detection signal Vdet in the touch detection period A corresponds to the touch detection signal Vdet of the basic principle of the touch detection described above. The A/D conversion unit 43 performs A/D conversion of the touch detection signal Vdet in the touch detection period A to perform the touch detection. Accordingly, the touch detection of one detection line is performed in the display device with a touch detection function 10.

Next, in the display period B, the source driver 13 applies the pixel signal Vpix to the signal line SGL, thereby performing a display of one horizontal line. As illustrated in FIG. 12, a change in the pixel signal Vpix is transmitted to the detection electrode TDL through a parasitic capacitance, and accordingly, the touch detection signal Vdet may change. However, in the display period B, by configuring the A/D conversion unit 43 not to perform the A/D conversion, the influence of the change in the pixel signal Vpix on the touch detection can be suppressed. After the supply of the pixel signal Vpix from the source driver 13 ends, the gate driver 12 changes the scan signal Vscan(n−1) of the scan line GCL of the (n−1)-th row from the high level to the low level, and the one display horizontal period ends.

Next, the gate driver 12 applies the scan signal Vscan to the scan line GCL of the n-th row that is different from the previous row, whereby the scan signal Vscan(n) is changed from a low level to a high level. Accordingly, the subsequent one display horizontal period is initiated.

In the subsequent touch detection period A, the drive electrode driver 14 applies the drive signal Vcom to the drive electrode COML of the m-th column different from the previous drive electrode COML. Then, A/D conversion of a change in the touch detection signal Vdet is performed by the A/D conversion unit 43, whereby touch detection of this one detection line is performed.

Next, in the display period B, the source driver 13 applies the pixel signal Vpix to the signal line SGL, thereby performing a display of one horizontal line. The drive electrode driver 14 applies the display drive signal Vcomd to the drive electrode COML as a common potential. The potential of the display drive signal Vcomd is set to a potential of the low level of the touch drive signal Vcomt in the touch detection period A, for example. Since the display device with a touch detection function 10 according to the first embodiment performs dot-inversion driving, the polarity of the pixel signal Vpix applied by the source driver 13 is inverted from that of the previous one display horizontal period. After the display period B ends, this one display horizontal period 1H ends.

Thereafter, by repeating the above-described operations, the display device with a touch detection function 10 performs the display operation by scanning the entire display face, and performs the touch detection operation by scanning the entire touch detection face.

In the display device with a touch detection function 10, during one display horizontal period (1H), the touch detection operation is performed in the touch detection period A and the display operation is performed in the display period B. As described above, since the touch detection operation and the display operation are performed in different periods, both the display operation and the touch detection operation can be performed during the same one display horizontal period, and the influence of the display operation on the touch detection can be suppressed.

Detection Electrode

Figure 13:
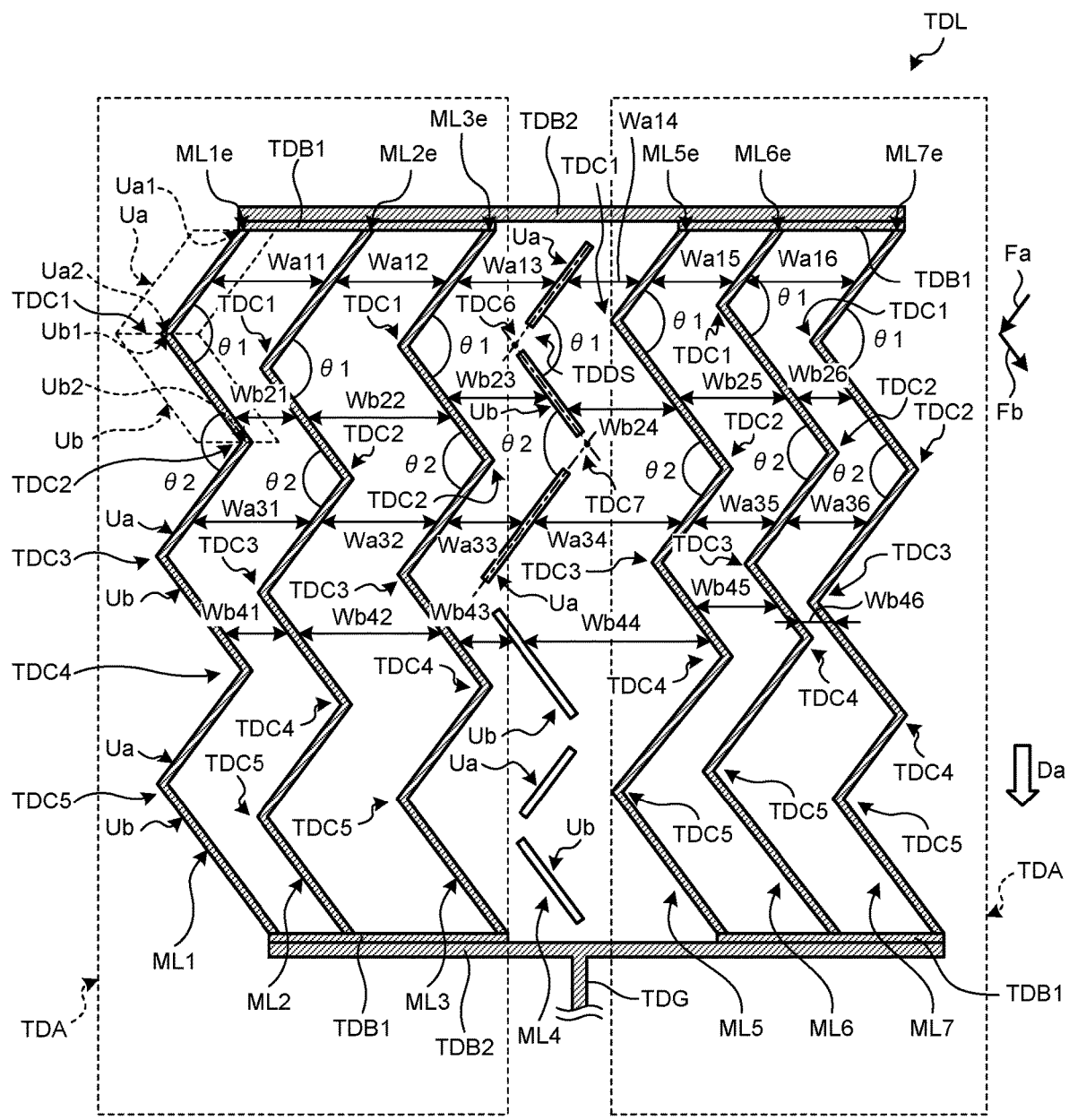
FIG. 13 is a schematic diagram illustrating arrangement of detection electrodes according to the first embodiment.

FIG. 13 is a schematic diagram illustrating arrangement of the detection electrode TDL according to the first embodiment. As illustrated in FIG. 13, the detection electrode TDL according to the first embodiment includes a plurality of thin conductive wires ML1, ML2, ML3, ML5, ML6 and ML7, which extend in a direction Da when seen in an overhead view, on a plane parallel to the counter substrate 3. Each of the thin conductive wires ML1, ML2, ML3, ML5, ML6 and ML7 has a zigzag shape or a waveform, and is folded at coupling portions TDC1, TDC2, TDC3, TDC4 and TDC5. In this manner, the thin conductive wires ML1, ML2, ML3, ML5, ML6 and ML7 have the coupling portions TDC1, TDC2, TDC3, TDC4 and TDC5 as bent portions.

The thin conductive wires ML1, ML2, ML3, ML5, ML6 and ML7 are formed of the same material. The thin conductive wires ML1, ML2 and ML3 are coupled to and conducted with each other via a first conducting portion TDB1 at an end portion ML1e of the thin conductive wire ML1, an end portion ML2e of the thin conductive wire ML2, and an end portion ML3e of the thin conductive wire ML3, respectively. The thin conductive wires ML1, ML2 and ML3 extend so as not to have a portion in which the wires intersect with each other except for a portion in which the wires are coupled to each other via the first conducting portion TDB1, and belong to a detection area TDA. The thin conductive wires ML5, ML6 and ML7 are coupled to and conducted with each other via the first conducting portion TDB1 at an end portion ML5e of the thin conductive wire ML5, an end portion ML6e of the thin conductive wire ML6, and an end portion ML7e of the thin conductive wire ML7, respectively. The thin conductive wires ML5, ML6 and ML7 extend so as not to have a portion in which the wires intersect with each other except for a portion in which the wires are coupled to each other via the first conducting portion TDB1, and belong to the detection area TDA.

A plurality of detection areas TDA are disposed with a constant interval therebetween. In the plurality of detection areas TDA, the first conducting portions TDB1 are coupled to and conducted with each other via a second conducting portion TDB2. The second conducting portion TDB2 is coupled to the touch detection unit 40 illustrated in FIG. 1 via a detection wiring TDG. The first conducting portion TDB1 and the second conducting portion TDB2 are formed of the same material as that of the thin conductive wires ML1, ML2, ML3, ML5, ML6 and ML7. The above-described configuration allows the number of the thin conductive wires to be reduced, and simultaneously allows resistance at the time of performing detection to be lowered since the detection is performed on a certain range using a plurality of thin conductive wires ML1, ML2, ML3, ML5, ML6 and ML7. The detection area TDA may include four or more thin conductive wires, or may include one or two thin conductive wires.

As illustrated in FIG. 13, the plurality of detection areas TDA are arranged with a constant interval therebetween. Since there is a difference in light shielding property in the detection electrode TDL between an area in which the thin conductive wires ML1, ML2, ML3, ML5, ML6 and ML7 are arranged and an area in which the thin conductive wires ML1, ML2, ML3, ML5, ML6 and ML7 of the detection electrode TDL are not arranged, the detection electrode TDL may tend to be visible. Thus, on the counter substrate 3, the thin conductive wire ML4 is arranged between the adjacent detection areas TDA as a dummy electrode that is not coupled to the detection wiring TDG. The thin conductive wire ML4 of the dummy electrode is formed of the same material as that of the thin conductive wires ML1, ML2, ML3, ML5, ML6 and ML7 of the detection electrode TDL. The thin conductive wire ML4 of the dummy electrode may be formed of a different material as long as the material has the light shielding property of the same level as that of the thin conductive wires ML1, ML2, ML3, ML5, ML6 and ML7.

As described above, the detection electrodes TDL extend in the direction (the direction Da) intersecting with the extending direction of the electrode patterns of the drive electrodes COML, and can be seen as stripe-shaped electrode patterns as a whole. Since the plurality of detection electrodes TDL illustrated in FIG. 13 are arranged in the extending direction of the electrode patterns of the drive electrodes COML, a portion between the adjacent detection electrodes TDL may be an area in which the thin conductive wires ML1, ML2, ML3, ML5, ML6 and ML7 are not arranged. Thus, a thin conductive wire, which is the same as the thin conductive wire ML4 of the dummy electrode, may also be arranged between the adjacent detection electrodes TDL.

The thin conductive wire ML1 includes a thin wire piece Ua and a thin wire piece Ub. In the thin conductive wire ML1, the thin wire pieces Ua and Ub are sequentially coupled to one another in order of Ua, Ub, Ua, Ub, Ua, and Ub, from the end portion ML1e in the direction Da. The thin wire pieces Ua and Ub extend in a first direction Fa and a second direction Fb, respectively. The extending directions of the thin wire pieces Ua and Ub are different from each other. The thin wire piece Ua is made of a conductive pattern material and includes a first end portion Ua1 and a second end portion Ua2. The thin wire piece Ub is made of a conductive pattern material and includes a first end portion Ub1 and a second end portion Ub2.

The second end portion Ua2 of the thin wire piece Ua and the first end portion Ub1 of the thin wire piece Ub are coupled to each other so that the thin wire piece Ua and the thin wire piece Ub are conducted with each other. In the thin conductive wire ML1, the thin wire pieces Ua and Ub are sequentially coupled to one another in order of Ua, Ub, Ua, Ub, Ua, and Ub, from the end portion ML1e in the direction Da. A portion in which the second end portion Ua2 and the first end portion Ub1 are coupled to each other is a coupling portion TDC1. The second end portion Ub2 of the thin wire piece Ub and the first end portion Ua1 of the thin wire piece Ua are coupled to each other so that the thin wire piece Ub and the thin wire piece Ua are conducted with each other. A portion in which the second end portion Ub2 and the first end portion Ua1 are coupled to each other is a coupling portion TDC2.

The thin wire pieces Ua extend in parallel to one another, and the thin wire pieces Ub also extend in parallel to one another, and thus, an angle θ1 formed between the thin wire piece Ua and the thin wire piece Ub, and an angle θ2 formed between the thin wire piece Ub and the thin wire piece Ua are identical to each other. The thin conductive wire ML4 of the dummy electrode has an angle, which is formed on a virtual point TDC6 between an extension line of the thin wire piece Ua and an extension line of the thin wire piece Ub at a divided portion TDDS, and this angle is the same as the angle θ1. Similarly, an angle, which is formed on a virtual point TDC7 between an extension line of the thin wire piece Ub and an extension line of the thin wire piece Ua, is the same as the angle θ2.

The thin conductive wire ML2 includes the thin wire piece Ua and the thin wire piece Ub. In the thin conductive wire ML2, the thin wire pieces Ua and Ub are sequentially coupled to one another in order of Ua, Ub, Ua, Ub, Ua, and Ub, from the end portion ML2e in the direction Da. The thin conductive wire ML2 includes a portion that does not overlap with the thin conductive wire ML1 when the two end portions ML2e thereof are overlaid with the two end portions ML1e of the thin conductive wire ML1. Thus, the thin conductive wire ML2 has a different shape from that of the thin conductive wire ML1.

The thin conductive wire ML3 includes the thin wire piece Ua and the thin wire piece Ub. In the thin conductive wire ML3, the thin wire pieces Ua and Ub are sequentially coupled to one another in order of Ua, Ub, Ua, Ub, Ua, and Ub, from the end portion ML3e in the direction Da. The thin conductive wire ML3 includes a portion that does not overlap with the thin conductive wire ML1 when the two end portions ML3e thereof are overlaid with the two end portions ML1e of the thin conductive wire ML1. The thin conductive wire ML3 includes a portion that does not overlap with the thin conductive wire ML2 when the two end portions ML3e thereof are overlaid with the two end portions ML2e of the thin conductive wire ML2. Thus, the thin conductive wire ML3 has a different shape from those of the thin conductive wire ML1 and the thin conductive wire ML2.

The thin conductive wires ML1, ML2 and ML3 have the same angle θ1 which is formed between the thin wire piece Ua and the thin wire piece Ub. The thin conductive wires ML1, ML2 and ML3 have different lengths of the thin wire pieces Ua that are coupled respectively to the end portions ML1e, ML2e and ML3e, but have the same length of the thin wire pieces Ua that are coupled to the thin wire pieces Ub such that one thin wire piece Ua is interposed between two thin wire pieces Ub. The thin conductive wires ML1, ML2 and ML3 have different lengths of the thin wire pieces Ub that are directly coupled to the first conducting portion TDB1, but have the same length of the thin wire pieces Ub that are coupled to the thin wire pieces Ua such that one thin wire piece Ub is interposed between two thin wire pieces Ua. Accordingly, the thin conductive wires ML1, ML2 and ML3 are different from one another in positions of the respective coupling portions TDC1 in the direction Da. For example, a difference among the positions of the coupling portions TDC1 in the direction Da is 1 μm to 15 μm. Similarly, the thin conductive wires ML1, ML2 and ML3 are different from one another in positions of the respective coupling portions TDC2, TDC3, TDC4 and TDC5 in the direction Da.

The thin conductive wires ML1, ML2 and ML3 may have the thin wire pieces Ua of the same length which are coupled respectively to the end portions ML1e, ML2e and ML3e, and have one or more thin wire pieces Ua of different lengths which are coupled to the thin wire pieces Ub while being interposed therebetween. Accordingly, the thin conductive wires ML1, ML2 and ML3 may be configured different from one another in positions of the respective coupling portions TDC1, TDC2, TDC3, TDC4 and TDC5.

As illustrated in FIG. 13, a distance Wa11 between a thin wire piece Ua of the thin conductive wire ML1 and a thin wire piece Ua of the thin conductive wire ML2 is different from a distance Wb21 between a thin wire piece Ub of the thin conductive wire ML1 and a thin wire piece Ub of the thin conductive wire ML2. The distance Wb21 is different from a distance Wa31 between a thin wire piece Ua of the thin conductive wire ML1 and a thin wire piece Ua of the thin conductive wire ML2. The distance Wa31 is different from a distance Wb41 between a thin wire piece Ub of the thin conductive wire ML1 and a thin wire piece Ub of the thin conductive wire ML2. A distance between the adjacent thin conductive wires ML1 and ML2 is not constant in the direction Da as can be seen from the distance Wa11, the distance Wb21, the distance Wa31, and the distance Wb41.

Similarly, a distance Wa12 between a thin wire piece Ua of the thin conductive wire ML2 and a thin wire piece Ua of the thin conductive wire ML3 is different from a distance Wb22 between a thin wire piece Ub of the thin conductive wire ML2 and a thin wire piece Ub of the thin conductive wire ML3. The distance Wb22 is different from a distance Wa32 between a thin wire piece Ua of the thin conductive wire ML2 and a thin wire piece Ua of the thin conductive wire ML3. The distance Wa32 is different from a distance Wb42 between a thin wire piece Ub of the thin conductive wire ML2 and a thin wire piece Ub of the thin conductive wire ML3. A distance between the adjacent thin conductive wires ML2 and ML3 is not constant in the direction Da as can be seen from the distance Wa12, the distance Wb22, the distance Wa32, and the distance Wb42.

As described above, the thin conductive wire ML4 includes the thin wire piece Ua and the thin wire piece Ub. The thin conductive wire ML4 of the dummy electrode has the divided portion TDDS, a slit in which there is no conductive metal material, between the thin wire piece Ua and the thin wire piece Ub, and between the thin wire piece Ub and the thin wire piece Ua. The divided portion TDDS impedes electrical conduction between the thin wire piece Ua and the thin wire piece Ub, and electrical conduction between the thin wire piece Ub and the thin wire piece Ua, thereby causing a capacitance difference from the detection electrode TDL. Thus, the influence of the dummy electrode on the absolute value |ΔV| illustrated in FIG. 6 can be reduced at the time of the touch detection even when a finger is in proximity to both of the thin conductive wire ML3 or the thin conductive wire ML5 and the thin conductive wire ML4 of the dummy electrode. In this manner, since the thin conductive wire ML4 of the dummy electrode includes the divided portion TDDS, there is a difference in capacitance from the detection electrode TDL, thereby reducing the influence on accuracy of the touch detection.

In the thin conductive wire ML4, the thin wire pieces Ua and Ub are arranged in order of Ua, Ub, Ua, Ub, Ua, and Ub, from the end portion ML4e in the direction Da. The thin wire pieces Ua and Ub extend in a first direction Fa and a second direction Fb, respectively. Accordingly, a difference in the light shielding property can be reduced between the area in which the detection electrode TDL is arranged and the area in which the detection electrode TDL is not arranged, thereby lowering the possibility that the detection electrode TDL becomes visible.

As illustrated in FIG. 13, a distance Wa13 between a thin wire piece Ua of the thin conductive wire ML3 and a thin wire piece Ua of the thin conductive wire ML4 is different from a distance Wb23 between a thin wire piece Ub of the thin conductive wire ML3 and a thin wire piece Ub of the thin conductive wire ML4. The distance Wb23 is different from a distance Wa33 between a thin wire piece Ua of the thin conductive wire ML3 and a thin wire piece Ua of the thin conductive wire ML4. The distance Wa33 is different from a distance Wb43 between a thin wire piece Ub of the thin conductive wire ML3 and a thin wire piece Ub of the thin conductive wire ML4. A distance between the adjacent thin conductive wires ML3 and ML4 is not constant in the direction Da as can be seen from the distance Wa13, the distance Wb23, the distance Wa33, and the distance Wb43. Further, the distance between the adjacent thin conductive wires ML3 and ML4 is not regular in the direction D1, and is a random value.

The thin conductive wire ML5 includes the thin wire piece Ua and the thin wire piece Ub. In the thin conductive wire ML5, the thin wire pieces Ua and Ub are sequentially coupled to one another in order of Ua, Ub, Ua, Ub, Ua, and Ub, from the end portion ML5e in the direction Da. The thin conductive wire ML5 includes a portion that does not overlap with the thin conductive wire ML1 when the two end portions ML5e thereof are overlaid with the two end portions ML1e of the thin conductive wire ML1. Thus, the thin conductive wire ML5 has a different shape from that of the thin conductive wire ML1. For example, the thin conductive wire ML5 has a portion in which each length of the thin wire pieces Ua, Ub, Ua, Ub, Ua, and Ub arranged in the direction Da is different from each corresponding length of the thin wire pieces Ua, Ub, Ua, Ub, Ua, and Ub of the conductive fine line ML1 arranged in the direction Da.

The thin conductive wire ML6 includes the thin wire piece Ua and the thin wire piece Ub. In the thin conductive wire ML6, the thin wire pieces Ua and Ub are sequentially coupled to one another in order of Ua, Ub, Ua, Ub, Ua, and Ub, from the end portion ML6e in the direction Da. The thin conductive wire ML6 includes a portion that does not overlap with the thin conductive wire ML5 when the two end portions ML6e thereof are overlaid with the two end portions ML5e of the thin conductive wire ML5. Thus, the thin conductive wire ML6 has a different shape from that of the thin conductive wire ML5.

The thin conductive wire ML7 includes the thin wire piece Ua and the thin wire piece Ub. In the thin conductive wire ML7, the thin wire pieces Ua and Ub are sequentially coupled to one another in order of Ua, Ub, Ua, Ub, Ua, and Ub, from the end portion ML7e in the direction Da. The thin conductive wire ML7 includes a portion that does not overlap with the thin conductive wire ML6 when the two end portions ML7e thereof are overlaid with the two end portions ML6e of the thin conductive wire ML6. The thin conductive wire ML7 includes a portion that does not overlap with the thin conductive wire ML5 when the two end portions ML7e thereof are overlaid with the two end portions ML5e of the thin conductive wire ML5. Thus, the thin conductive wire ML7 has a different shape from those of the thin conductive wire ML5 and the thin conductive wire ML6.

The thin conductive wires ML5, ML6 and ML7 have the same angle $\theta 1$ which is formed between the thin wire piece Ua and the thin wire piece Ub. The thin conductive wires ML5, ML6 and ML7 have different lengths of the thin wire pieces Ua that are coupled respectively to the end portions ML5e, ML6e and ML7e, and also have different lengths of the thin wire pieces Ua that are coupled to the thin wire pieces Ub such that one thin wire piece U1 is interposed between two thin wire pieces Ub. In the thin conductive wires ML5, ML6 and ML7, lengths respectively obtained by connecting the first end portion Ua1 of the first thin wire piece Ua and the second end portion Ua2 of the first thin wire piece Ua with a straight line are randomly different from one another. In the thin conductive wires ML5, ML6 and ML7, lengths respectively obtained by connecting the first end portion Ub1 of the second thin wire piece Ub and the second end portion Ub2 of the second thin wire piece Ub with a straight line are randomly different from one another. Accordingly, in the thin conductive wires ML5, ML6 and ML7, positions of the respective coupling portions TDC1 are different from one another in the direction Da. For example, a difference among the positions of the coupling portions TDC1 in the direction Da is 1 µm to 15 µm. Similarly, in the thin conductive wires ML5, ML6 and ML7, positions of the respective coupling portions TDC2, TDC3, TDC4 and TDC5 in the direction Da are different from one another.

Similarly to the thin conductive wires ML1, ML2 and ML3, the thin conductive wires ML5, ML6 and ML7 may have different lengths of the thin wire pieces Ua that are coupled respectively to the end portions ML1e, ML2e and ML3e, but may have the same length of the thin wire pieces Ua that are coupled to the thin wire pieces Ub such that one thin wire piece Ua is interposed between two thin wire pieces Ub.

As illustrated in FIG. 13, a distance Wa14 between a thin wire piece Ua of the thin conductive wire ML4 and a thin wire piece Ua of the thin conductive wire ML5 is different from a distance Wb24 between a thin wire piece Ub of the thin conductive wire ML4 and a thin wire piece Ub of the thin conductive wire ML5. The distance Wb24 is different from a distance Wa34 between a thin wire piece Ua of the thin conductive wire ML4 and a thin wire piece Ua of the thin conductive wire ML5. The distance Wa34 is different from a distance Wb44 between a thin wire piece Ub of the thin conductive wire ML4 and a thin wire piece Ub of the thin conductive wire ML5. A distance between the adjacent thin conductive wires ML4 and ML5 is not constant in the direction Da as can be seen from the distance Wa14, the distance Wb24, the distance Wa34, and the distance Wb44. Further, the distance between the adjacent thin conductive wires ML4 and ML5 do not have regularity in the direction Da, and is a random value.

Similarly, a distance Wa15 between a thin wire piece Ua of the thin conductive wire ML5 and a thin wire piece Ua of the thin conductive wire ML6 is different from a distance Wb25 between a thin wire piece Ub of the thin conductive wire ML5 and a thin wire piece Ub of the thin conductive wire ML6. The distance Wb25 is different from a distance Wa35 between a thin wire piece Ua of the thin conductive wire ML5 and a thin wire piece Ua of the thin conductive wire ML6. The distance Wa35 is different from a distance Wb45 between a thin wire piece Ub of the thin conductive wire ML5 and a thin wire piece Ub of the thin conductive wire ML6. A distance between the adjacent thin conductive wires ML5 and ML6 is not constant in the direction Da as can be seen from the distance Wa15, the distance Wb25, the distance Wa35, and the distance Wb45. Further, the distance between the adjacent thin conductive wires ML5 and ML6 is not regular in the direction Da, and is a random value.

Similarly, a distance Wa16 between a thin wire piece Ua of the thin conductive wire ML6 and a thin wire piece Ua of the thin conductive wire ML7 is different from a distance Wb26 between a thin wire piece Ub of the thin conductive wire ML6 and a thin wire piece Ub of the thin conductive wire ML7. The distance Wb26 is different from a distance Wa36 between a thin wire piece Ua of the thin conductive wire ML6 and a thin wire piece Ua of the thin conductive wire ML7. The distance Wa36 is different from a distance Wb46 between a thin wire piece Ub of the thin conductive wire ML6 and a thin wire piece Ub of the thin conductive wire ML7. A distance between the adjacent thin conductive wires ML6 and ML7 is not constant in the direction Da as can be seen from the distance Wa16, the distance Wb26, the distance Wa36, and the distance Wb46. Further, the distance between the adjacent thin conductive wires ML6 and ML7 is not regular in the direction Da, and is a random value.

Each width of the thin wire piece Ua and the thin wire piece Ub is preferably in the range of 3 µm to 10 µm. This is because, when the widths of the thin wire piece Ua and the thin wire piece Ub are 10 µm or less, the area of a portion which covers an aperture in which the transmission of light is not suppressed by a black matrix, or the scan lines GCL and the signal lines SGL in the display area Ad becomes smaller, thereby lowering a possibility that an aperture ratio decreases. Further, when the widths of the thin wire piece Ua and the thin wire piece Ub are 3 μm or more, a wiring pattern is stable, thereby lowering a possibility of disconnection. When the widths of the thin wire piece Ua and the thin wire piece Ub are smaller than 3 μm, the adjacent thin conductive wires may be coupled to and conducted with each other to prevent the disconnection from occurring.

The thin conductive wires ML1, ML2, ML3, ML4, ML5, ML6 and ML7 of the detection electrode TDL are formed of a conductive metal material such as aluminum (Al), copper (Cu), silver (Ag), molybdenum (Mo), chromium (Cr), tungsten (W), and an alloy of these materials. Alternatively, the thin conductive wires ML1, ML2, ML3, ML4, ML5, ML6 and ML7 of the detection electrode TDL may be formed of aluminum (Al), copper (Cu), silver (Ag), molybdenum (Mo), chromium (Cr), tungsten (W), or an oxide of these materials (metal oxide), and have conductivity. The thin conductive wires ML1, ML2, ML3, ML4, ML5, ML6 and ML7 may be formed by patterning a laminated body in which one or more of the above-described metal materials and one or more of the above-described metal oxides are laminated. The thin conductive wires ML1, ML2, ML3, ML4, ML5, ML6 and ML7 may be formed by patterning a laminated body in which one of more of the above-described metal materials or metal oxides, and one or more of transparent conductive oxides such as indium tin oxide (ITO) as a material of the transparent electrode are laminated. The thin conductive wires ML1, ML2, ML3, ML4, ML5, ML6 and ML7 have lower resistance than the transparent conductive oxide such as indium tin oxide (ITO) as the material of the transparent electrode. The material of the thin conductive wires ML1, ML2, ML3, ML4, ML5, ML6 and ML7 has a lower transmittance than a transmittance of indium tin oxide (ITO) in the same film thickness. For example, the material of the thin conductive wires ML1, ML2, ML3, ML4, ML5, ML6 and ML7 may have a transmittance of 10% or less.

As described above, the pixels Pix are arranged in a matrix in the direction parallel to the scan lines GCL and the direction parallel to the signal lines SGL. When the scan lines GCL and the signal lines SGL are covered by the black matrix, the black matrix prevents the transmission of light. When the scan lines GCL and the signal lines SGL are not covered by the black matrix, the scan lines GCL and the signal lines SGL prevent the transmission of light. A periodic pattern having a plurality of straight lines parallel to the scan lines GCL tends to appear on the display area Ad in the first embodiment. A periodic pattern having a plurality of straight lines parallel to the signal lines SGL also tend to appear on the display area Ad. Thus, when the detection electrodes TDL are overlaid with the surface of the display area Ad in the direction vertical to the surface, moire may become visible as a bright and dark pattern is formed by the interference between the pattern appearing on the display area Ad and the detection electrodes TDL.

In the first embodiment, the adjacent thin conductive wire ML1 and thin conductive wire ML2 are different in shape, and the adjacent thin conductive wire ML3 and thin conductive wire ML4 are different in shape. Since adjacent thin conductive wires among the thin conductive wires M1 to M7 are different in shape as described above, angles formed between each of the thin conductive wires ML1, ML2, ML3, ML4, ML5, ML6 and ML7, and the pattern appearing on the display area Ad are different depending on a position. Therefore, the above-described bright and dark pattern becomes hard to be periodic, thereby lowering the possibility that the moire is visible according to the first embodiment.

In the first embodiment, a shape in which the thin conductive wires ML1, ML2, and ML3 are combined by the first conducting portion TDB1, and a shape in which the thin conductive wires ML5, ML6, and ML7 are combined by the first conducting portion TDB1 are different from each other. Thus, the angles formed between each of the thin conductive wires ML1, ML2, ML3, ML5, ML6 and ML7, and the above-described pattern appearing on the display area Ad are different depending on a position. Therefore, in the detection device according to the first embodiment, the above-described bright and dark pattern hardly has a periodicity, thereby lowering the possibility that the moire is visible.

In the technique discussed in JP-A-2010-197576, when visible light is incident, a light intensity pattern, in which light is diffracted or scattered by a plurality of detection electrodes, becomes close to a pattern in which a plurality of points of light are scattered. Although positions or the number of the scattered points of light of the light intensity pattern can be changed when a viewer directly tilts the detection device, it is difficult to eliminate visibility of the points of light of the light intensity pattern. In the technique discussed in JP-A-2010-197576, angles formed between adjacent thin wire piece a and thin wire piece b are random. Thus, when a viewer directly tilts the detection device, diffraction or scattering tends to be newly caused and the scattered points of light of the light intensity pattern tend to appear.

On the other hand, the angle θ1 and the angle θ2 formed between the adjacent thin wire piece a and thin wire piece b are constant in the entire part of one thin conductive wire of the thin conductive wires ML1, ML2, ML3, ML4, ML5, ML6 and ML7 according to the first embodiment. Thus, when visible light is incident on the thin conductive wires ML1, ML2, ML3, ML4, ML5, ML6 and ML7, a light intensity pattern in which light is diffracted or scattered becomes hard to spread in each of the thin conductive wires ML1, ML2, ML3, ML4, ML5, ML6 and ML7. Thus, the light intensity pattern in which light is diffracted or scattered tends to gather in four directions in each of the thin conductive wires ML1, ML2, ML3, ML4, ML5, ML6 and ML7, and a constant directivity is likely to appear. Further, when a viewer directly tilts the detection device according to the first embodiment, it becomes easy to avoid forming an angle by which the light intensity pattern tends to appear. As a result, the light intensity pattern in which light is diffracted or scattered in each of the thin conductive wires ML1, ML2, ML3, ML4, ML5, ML6 and ML7 becomes hard to be visible.

As described above, the detection device according to the first embodiment is capable of detecting the external proximity object, and includes the counter substrate 3 and the detection electrodes TDL. The detection electrode TDL includes the thin conductive wires ML1, ML2, ML3, ML4, ML5, ML6 and ML7. Each of the thin conductive wires ML1, ML2, ML3, ML5, ML6 and ML7 includes the first thin wire pieces Ua, each of which connects the first end portion Ua1 and the second end portion Ua2 with a straight line and the second thin wire pieces Ub, each of which connects the first end portion Ub1 and the second end portion Ub2 with a straight line. The first thin wire pieces Ua and the second thin wire pieces Ub are made of a metal material. In each of the thin conductive wires ML1, ML2, ML3, ML5, ML6 and ML7, the first thin wire pieces Ua and the second thin wire pieces Ub are sequentially connected by coupling one of the first thin wire pieces Ua and one of the second thin wire pieces Ub to each other with the coupling portion, and extend in a direction parallel to the surface of the counter substrate 3. Further, the angle θ1 or the angle θ2, formed by a first direction Fa in which one of the first thin wire pieces Ua extends and a second direction Fb in which one of the second thin wire pieces Ub extends intersecting with each other, the direction different from the first direction Fa is constant in the entire part of one thin conductive wire. A distance between adjacent first thin wire pieces Ua of different thin conductive wires is not constant. Accordingly, at least a distance between adjacent two wires among a plurality of adjacent thin conductive wires is different from a distance between other adjacent two wires.

As a result, the bright and dark pattern becomes hard to be periodic, and thereby lowering the possibility that the moire is visible. The light intensity pattern in which light is diffracted or scattered in the detection electrodes TDL becomes hard to be visible.

Further, in addition to the above configuration, it is preferable that each of the angle θ1 or the angle θ2 formed in the thin conductive wires included in the detection electrode TDL be constant. According to such a configuration, it is possible to suppress the visibility of the moire, and also suppress the visibility of the glare, caused by the light intensity pattern in which light is diffracted or scattered by the detection electrodes TDL.

When each distance between the adjacent first thin wire pieces Ua is set to be randomly different depending on a position in a predetermined direction (the direction Da), the bright and dark pattern becomes hard to be periodic, thereby lowering the possibility that the moire is visible.

As described above, the display device with a touch detection function 10 includes the plurality of pixel electrodes 22 provided in the display area Ad, and the drive electrode COML which is provided to oppose the pixel electrode 22 and divided in plural. In the display period B in which the display operation is performed, the control unit 11 applies a display drive voltage between each of the pixel electrodes 22 and the drive electrode COML based on the video signal Vdisp. In the touch detection period A in which the touch detection operation is performed, the control unit 11 selects and scans the drive electrode COML to which the drive signal is supplied among the plurality of drive electrodes COML, thereby allowing the touch detection unit 40 to detect the external proximity object based on a change in capacitance of the detection electrodes TDL.

First Modification of First Embodiment

Figure 14:
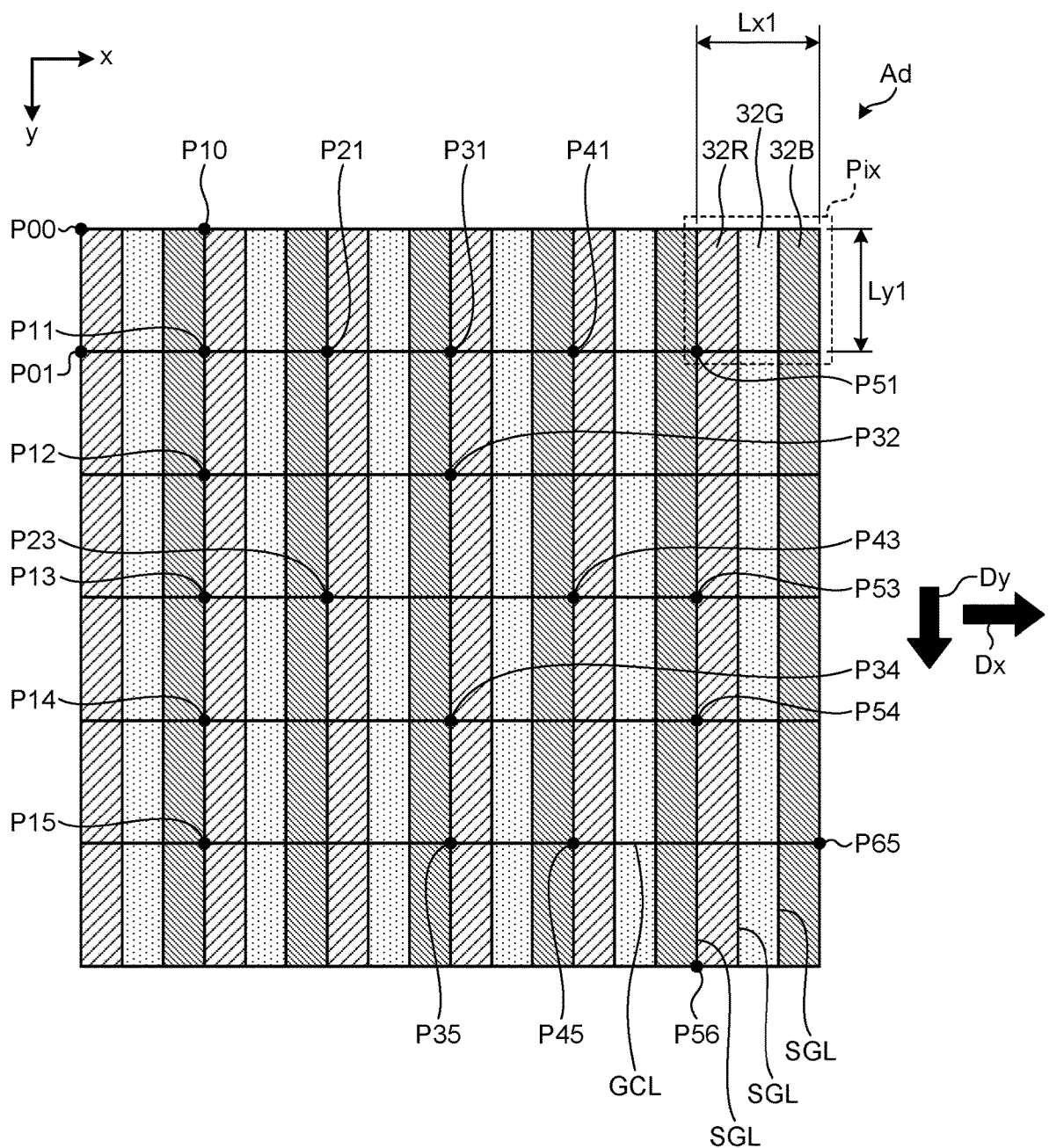
FIG. 14 is a schematic diagram illustrating the relative positional relationship between a first end portion and a second end portion of a thin wire piece according to a first modification of the first embodiment.

FIG. 14 is a schematic diagram illustrating the relative positional relationship between a first end portion and a second end portion of a thin wire piece according to a first modification of the first embodiment. According to the first modification of the first embodiment, extending directions of the thin wire piece Ua and the thin wire piece Ub are defined by the array of the pixels Pix in the detection electrode TDL as illustrated in FIG. 13. More specifically, the extending directions of the thin wire piece Ua and the thin wire piece Ub are defined by angles formed with respect to a pixel array direction Dy illustrated in FIG. 14. The direction Da in which the detection electrodes TDL extend is parallel to the pixel array direction Dy illustrated in FIG. 14.

The pixel array direction Dy and a pixel orthogonal direction Dx illustrated in FIG. 14. As described above, the display area Ad includes the plurality of pixels Pix in which the color areas 32R, 32G and 32B are associated with the respective subpixels SPix, and the color areas 32R, 32G and 32B are included as one set. The pixels Pix are arranged in a matrix in the direction parallel to the scan lines GCL and the direction parallel to the signal lines SGL. In the pixel Pix, the color areas 32R, 32G and 32B are arranged so as to be adjacent to one another with the scan lines GCL interposed therebetween.

The pixel array direction Dy is a direction in which a color area exhibiting highest human visibility is arranged. The pixel orthogonal direction Dx is a direction orthogonal to the pixel array direction Dy on the plane parallel to the surface of the counter substrate 3. A color which exhibits the highest human visibility among the three colors of R (red), G (green), and B (blue) is G (green). Since the color area 32G is arranged in the direction parallel to the signal lines SGL in FIG. 14, the pixel array direction Dy is the direction parallel to the signal lines SGL in the first modification of the first embodiment.

To describe the relative positional relationship between the first end portion Ub1 and the second end portion Ub2 of the thin wire piece Ub, assume that an arbitrary point among the intersections of the scan lines GCL and the signal lines SGL is the origin P00 in FIG. 14, and xy coordinates are defined by setting coordinates of the origin P00 as (0, 0). The x-axis is arranged in a direction parallel to the pixel orthogonal direction Dx, and the y-axis is arranged in a direction parallel to the pixel array direction Dy. A maximum length of one pixel Pix in the x direction is regarded as a unit length in the x direction, and a maximum length of one pixel Pix in the y direction is regarded as a unit length in the y direction. The maximum length of one pixel Pix in the x direction is a first unit length Lx1, and the maximum length of one pixel Pix in the y direction is a second unit length Ly1. For example, a ratio between the first unit length Lx1 and the second unit length Ly1 according to the first modification of the first embodiment is 1:1.

The coordinates of a given point are, for example, (1, 1), where the first coordinate represents a point the first unit length Lx1 from the origin P00 in the x direction and the second coordinate represents a point the second unit length Ly1 from the origin P00 in the y direction. In the xy coordinates, a point P01 is a point with coordinates of (0, 1). A point P15 is a point with coordinates of (1, 5). A point P14 is a point with coordinates of (1, 4). A point P13 is a point with coordinates of (1, 3). A point P12 is a point with coordinates of (1, 2). A point P35 is a point with coordinates of (3, 5). A point P23 is a point with coordinates of (2, 3). A point P34 is a point with coordinates of (3, 4). A point P45 is a point with coordinates of (4, 5). A point P56 is a point with coordinates of (5, 6). A point P11 is a point with coordinates of (1, 1). A point P65 is a point with coordinates of (6, 5). A point P54 is a point with coordinates of (5, 4). A point P43 is a point with coordinates of (4, 3). A point P32 is a point with coordinates of (3, 2). A point P53 is a point with coordinates of (5, 3). A point P21 is a point with coordinates of (2, 1). A point P31 is a point with coordinates of (3, 1). A point P41 is a point with coordinates of (4, 1). A point P51 is a point with coordinates of (5, 1). A point P10 is a point with coordinates of (1, 0).

Evaluation Example Relating to Angle with Respect to Pixel Array Direction Dy

Assuming that the first end portion Ub1 of the thin wire piece Ub is positioned at the point P00, an evaluation on visibility of moire has been performed by changing a direction at which the second end portion Ub2 is positioned.

Evaluation results will be described below as Evaluation Examples 1 to 21 illustrated in FIG. 15.

Evaluation

In the moire evaluation, how the moire on display images of the display device with a touch detection function 10 corresponding to Evaluation Examples 1 to 21 is recognized by human eyes is evaluated as four grades. More specifically, as a criterion for the moire evaluation, "EXCELLENT" is given to a case in which the moire is hardly visible even when a distance between the surface of the display device with a touch detection function 1 and the human eye is less than 30 cm. As a criterion for the moire evaluation, "GOOD" is given to a case in which the moire is hardly visible when a distance between the display device with a touch detection function 10 and the human eye is equal to or more than 30 cm. As a criterion for the moire evaluation, "FAIR" is given to a case in which the moire is hardly visible when a distance between the display device with a touch detection function 10 and the human eye is equal to or more than 60 cm. Further, as a criterion for the moire evaluation, "POOR" is given to a case in which the moire is visible even when a distance between the display device with a touch detection function 10 and the human eye is equal to or more than 60 cm.

In Evaluation Examples 6 to 10 and 12 to 16, the second end portion Ub2 of the thin wire piece Ub is positioned in a direction toward a target position from the first end portion Ub1. This target position is separated from the first end portion Ub1 by two or more times (integer multiple) of the first unit length Lx1 in the pixel orthogonal direction Dx, and by two or more times (integer multiple) of the second unit length Ly1 in the pixel array direction Dy. Evaluation Examples 6 to 10 and 12 to 16 satisfy a first condition that a value of an integer multiple of the first unit length Lx1 and a value of an integer multiple of the second unit length Ly1 are different from each other. Further, Evaluation Examples 6 to 10 and 12 to 16 satisfy a condition that an extending direction of the thin wire piece Ub forms an angle of larger than 27 degrees and smaller than 45 degrees, or an angle of larger than 45 degrees and smaller than 63 degrees with respect to the pixel array direction Dy. Further, the thin conductive wire according to the first modification of the first embodiment satisfying the first condition is evaluated as "EXCELLENT", "GOOD" and "FAIR" in the moire evaluation of Evaluation Examples 6 to 10 and 12 to 16 as illustrated in FIG. 15, and the visibility of the moire is suppressed in these examples.

Evaluation Examples 6, 8 to 10, 12 to 14, and 16 satisfy a second condition that a value of an integer multiple of the first unit length Lx1 and a value of an integer multiple of the second unit length Ly1 are equal to or larger than 3. Further, Evaluation Examples 6, 8 to 10, 12 to 14, and 16, which satisfy the second condition, are evaluated as "EXCELLENT" or "GOOD" in the moire evaluation, and the visibility of the moire is further suppressed in these examples.

Evaluation Examples 8 to 10 and 12 to 14 satisfy a third condition that a difference between a value of an integer multiple of the first unit length Lx1 and a value of an integer multiple of the second unit length Ly1 is 1. Further, each case of Evaluation Examples 8 to 10 and 12 to 14 is evaluated as "EXCELLENT" in the moire evaluation, and the visibility of the moire is further suppressed in these examples.

As described above, the pixels Pix are arranged in a matrix in the direction parallel to the scan lines GCL and in the direction parallel to the signal lines SGL. When the scan lines GCL and the signal lines SGL are covered by the black matrix, the black matrix prevents the transmission of light. When the scan lines GCL and the signal lines SGL are not covered by the black matrix, the scan lines GCL and the signal lines SGL prevent the transmission of light. A periodic pattern having a plurality of straight lines parallel to the pixel orthogonal direction Dx and extending in a direction parallel to the scan lines GCL tends to appear on the display area Ad in the first modification of the first embodiment. A periodic pattern having a plurality of straight lines parallel to the pixel array direction Dy and extending in a direction parallel to the signal lines SGL also tends to appear on the display area Ad. Thus, when the detection electrodes TDL are overlaid with the surface of the display area Ad in the direction vertical to the surface, moire may become visible as a bright and dark pattern is formed by the interference between the pattern appearing on the display area Ad and the detection electrodes TDL.

In the first modification of the first embodiment, the thin conductive wires ML1, ML2, ML3, ML4, ML5, ML6 and ML7 each include the thin wire piece Ub that satisfies the first condition, and thus, a periodicity in the bright and dark pattern becomes short to a degree that a human hardly recognizes. For example, the thin wire piece Ub extends in a direction having an angle with respect to the pixel orthogonal direction Dx and the pixel array direction Dy. When the first condition is satisfied, the angle is equal to or larger than a certain value, and thus the periodicity in the bright and dark pattern tends to be short. As a result, the possibility that the moire is visible can be lowered by the thin conductive wires ML1, ML2, ML3, ML4, ML5, ML6 and ML7 each including the thin wire piece Ub that satisfies the first condition. Further, when the thin wire piece Ua and the thin wire piece Ub satisfy the first condition, the possibility that the moire is visible can be lowered.

The thin wire piece Ub extends in a direction having an angle with respect to the pixel array direction Dy, and a tangent of the angle is in the range of values larger than a value obtained by dividing the first unit length Lx1 by twice the second unit length Ly1, and smaller than a value obtained by dividing twice the first unit length Lx1 by the second unit length Ly1, and is different from a value obtained by dividing the first unit length Lx1 by the second unit length Ly1. Thus, the angle formed in the extending direction of the thin wire piece Ub with respect to the pixel orthogonal direction Dx and the pixel array direction Dy is equal to or larger than a certain value, and the periodicity of the bright and dark pattern tends to be short. As a result, the display device with a touch detection function 10 according to the first modification of the first embodiment is capable of lowering the possibility that the moire is visible.

When the detection electrodes TDL and the drive electrodes COML are formed using a conductive material such as a metal material, electrolytic corrosion may be generated. Thus, in the display device with a touch detection function 10 according to the first embodiment, the detection electrodes TDL and the drive electrodes COML are positioned on different planes in the vertical direction of the glass substrate 31 with the glass substrate 31 interposed therebetween. Accordingly, the display device with a touch detection function 10 according to the first embodiment is capable of preventing the generation of electrolytic corrosion. Further, the drive electrodes COML are preferably formed of a translucent material. Accordingly, it is possible to lower the possibility that the moire is visible caused by the interference between the detection electrodes TDL and the drive electrodes COML.

Further, the drive electrodes COML are arranged on the TFT substrate 21 opposing the surface of the glass substrate 31 in the vertical direction. When the surface of the glass substrate 31 and the drive electrodes COML are separated from each other in a direction perpendicular to the surface of the glass substrate 31, a difference between a periodicity of the pattern that appears on the display area Ad and that of the arrangement of the drive electrodes COML is changed according to an angle at which the human looks at the surface of the glass substrate 31. However, by disposing the drive electrodes COML on the TFT substrate 21, it is possible to diminish the change in the difference between the periodicity of the pattern appearing on the display area Ad and that of the arrangement of the drive electrodes COML according to the angle at which the human looks at the surface of the glass substrate 31. The drive electrodes COML according to the first embodiment are arranged so as to extend in the pixel array direction Dy or the pixel orthogonal direction Dx described above. Accordingly, the drive electrodes COML extend in the direction parallel to the scan lines GCL or in the direction parallel to the signal lines SGL, thereby lowering the possibility that the aperture ratio decreases.

Second Modification of First Embodiment

Figure 16:
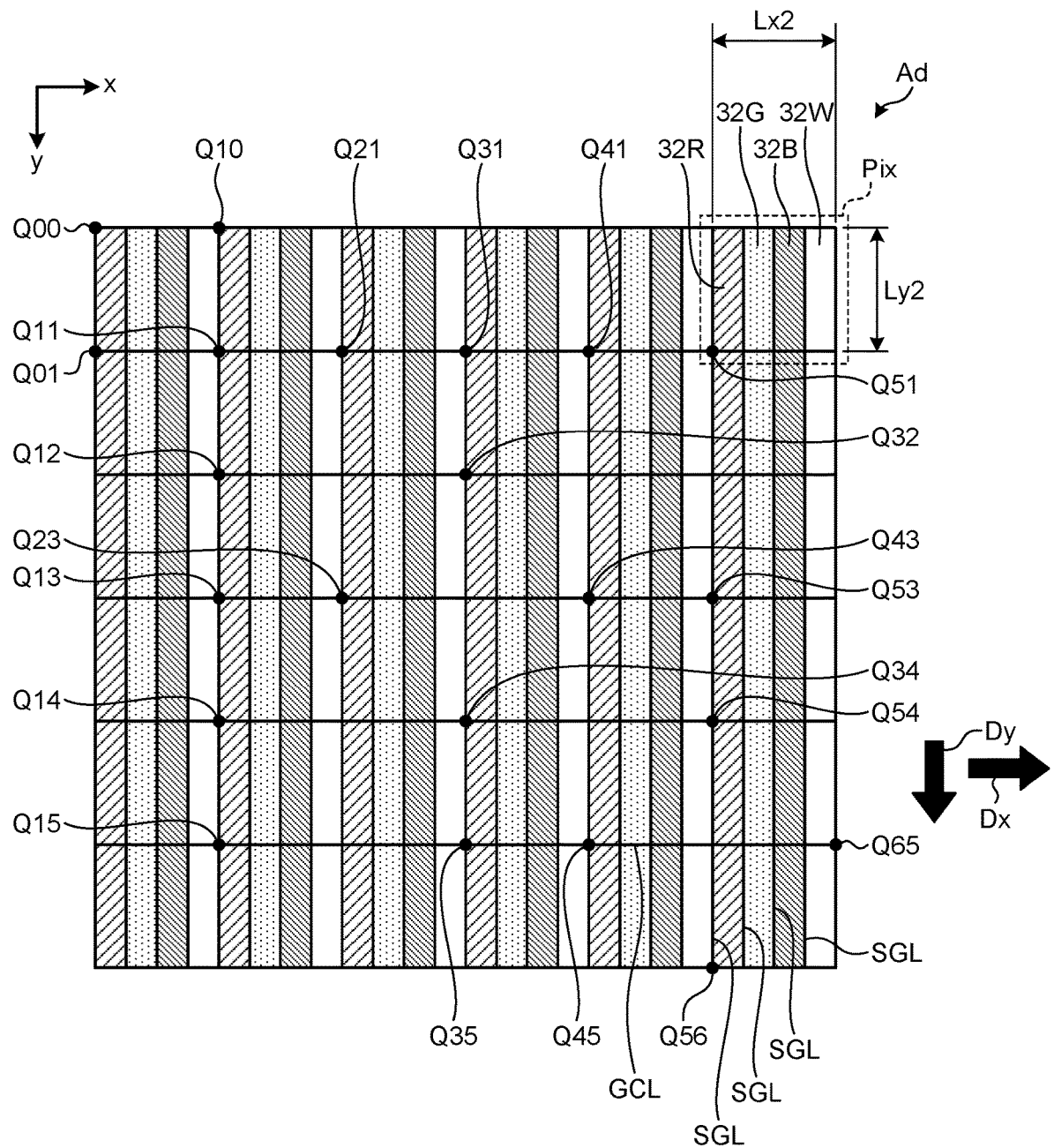
FIG. 16 is a schematic diagram illustrating the relative positional relationship between a first end portion and a second end portion of a thin wire piece according to a second modification of the first embodiment.

FIG. 16 is a schematic diagram illustrating the relative positional relationship between a first end portion and a second end portion of a thin wire piece according to a second modification of the first embodiment. According to the second modification of the first embodiment, in the detection electrode TDL, extending directions of the thin wire piece Ua and the thin wire piece Ub are defined by the array of the pixels Pix, as illustrated in FIG. 13. More specifically, the extending directions of the thin wire piece Ua and the thin wire piece Ub are defined by angles formed with respect to a pixel array direction Dy illustrated in FIG. 16. The direction Da in which the detection electrode TDL extends is the same as the pixel array direction Dy illustrated in FIG. 16.

The following describes the pixel array direction Dy and a pixel orthogonal direction Dx illustrated in FIG. 16. As described above, the display area Ad includes the plurality of pixels Pix in which the color areas 32R, 32G, 32B, and 32W are associated with the respective subpixels SPix, and the color areas 32R, 32G, 32B, and 32W are included as one set. The plurality of pixels Pix are arranged in a matrix in the direction parallel to the scan lines GCL and the direction parallel to the signal lines SGL. In the pixel Pix, the color areas 32R, 32G, 32B, and 32W are arranged so as to be adjacent to one another with the scan lines GCL interposed therebetween.

The pixel array direction Dy is a direction in which a color area exhibiting the highest human visibility is arranged. A color with the highest human visibility among four colors of R (red), G (green), B (blue), and W (while) is W (while). Since the color area 32W is arranged in a direction parallel to the signal lines SGL in FIG. 16, the pixel array direction Dy is the direction parallel to the signal lines SGL.

To describe the relative positional relationship between the first end portion Ub1 and the second end portion Ub2 of the thin wire piece Ub, assume that an arbitrary point among the intersections of the scan lines GCL and the signal lines SGL is set as an origin point Q00 in FIG. 16, and xy coordinates are defined by setting coordinates of the origin Q00 as (0, 0). The x-axis is arranged in a direction parallel to the pixel orthogonal direction Dx, and the y-axis is arranged in a direction parallel to the pixel array direction Dy. A maximum length of one pixel Pix in the x direction is regarded as a unit length in the x direction, and a maximum length of one pixel Pix in the y direction is regarded as a unit length in the y direction. The maximum length of one pixel Pix in the x direction is a first unit length Lx2, and the maximum length of one pixel Pix in the y direction is a second unit length Ly2. For example, a ratio between the first unit length Lx2 and the second unit length Ly2 according to the second modification of the first embodiment is 4:3.

The coordinates of a given point are, for example, (1, 1), where the first coordinate represents a point the first unit length Lx2 from the origin Q00 in the x direction and the second coordinate represents a point the second unit length Ly2 from the origin Q00 in the y direction. In the xy coordinates, a point Q01 is a point with coordinates of (0, 1). A point Q15 is a point with coordinates of (1, 5). A point Q14 is a point with coordinates of (1, 4). A point Q13 is a point with coordinates of (1, 3). A point Q12 is a point with coordinates of (1, 2). A point Q35 is a point with coordinates of (3, 5). A point Q23 is a point with coordinates of (2, 3). A point Q34 is a point with coordinates of (3, 4). A point Q45 is a point with coordinates of (4, 5). A point Q56 is a point with coordinates of (5, 6). A point Q11 is a point with coordinates of (1, 1). A point Q65 is a point with coordinates of (6, 5). A point Q54 is a point with coordinates of (5, 4). A point Q43 is a point with coordinates of (4, 3). A point Q32 is a point with coordinates of (3, 2). A point Q53 is a point with coordinates of (5, 3). A point Q21 is a point with coordinates of (2, 1). A point Q31 is a point with coordinates of (3, 1). A point Q41 is a point with coordinates of (4, 1). A point Q51 is a point with coordinates of (5, 1). A point Q10 is a point with coordinates of (1, 0).

Evaluation Example Relating to Angle with Respect to Pixel Array Direction Dy

Assuming that the first end portion Ub1 of the thin wire piece Ub is positioned at the point Q00, an evaluation on visibility of moire has been performed by changing a direction at which the second end portion Ub2 is positioned.

Evaluation results will be described below as Evaluation Examples 22 to 42 illustrated in FIG. 17.

Evaluation

In the moire evaluation, how the moire on display images of the display device with a touch detection function 10 corresponding to Evaluation Examples 22 to 42 is recognized by human eyes is evaluated as four grades. More specifically, as a criterion for the moire evaluation, "EXCELLENT" is given to a case in which the moire is hardly visible even when a distance between the surface of the display device with a touch detection function 10 and the human eye is less than 30 cm. As a criterion for the moire evaluation, "GOOD" is given to a case in which the moire is hardly visible when a distance between the display device with a touch detection function 10 and the human eye is equal to or more than 30 cm. As a criterion for the moire evaluation, "FAIR" is given to a case in which the moire is hardly visible when a distance between the display device with a touch detection function 10 and the human eye is equal to or more than 60 cm. Further, as a criterion for the moire evaluation, "POOR" is given to a case in which the moire is visible even when a distance between the display device with a touch detection function 10 and the human eye is equal to or more than 60 cm.

In Evaluation Examples 27 to 31 and 33 to 37, the second end portion Ub2 of the thin wire piece Ub is positioned in a direction toward a target position from the first end portion Ub1. This target position is separated from the first end portion Ub1 by two or more times (integer multiple) of the first unit length Lx2 in the pixel orthogonal direction Dx and by two or more times (integer multiple) of the second unit length Ly2 in the pixel array direction Dy, and satisfies a first condition that a value of an integer multiple of the first unit length Lx2 and a value of an integer multiple of the second unit length Ly2 are different from each other. Further, each case of Evaluation Examples 27 to 31 and 33 to 37 is evaluated as "EXCELLENT", "GOOD" and "FAIR" in the moire evaluation, and the visibility of the moire is suppressed in these examples.

Evaluation Examples 27, 29 to 31, 33 to 35, and 37 satisfy a second condition that a value of an integer multiple of the first unit length Lx2 and a value of an integer multiple of the second unit length Ly2 are 3 or larger. Further, Examples 27, 29 to 31, 33 to 35, and 37 are evaluated as "EXCELLENT" or "GOOD" in the moire evaluation, and the visibility of the moire is further suppressed in these examples.

Evaluation Examples 29 to 31 and 33 to 35 satisfy a third condition that a difference between a value of an integer multiple of the first unit length Lx2 and a value of an integer multiple of the second unit length Ly2 is 1. Each case of Evaluation Examples 29 to 31 and 33 to 35 is evaluated as "EXCELLENT" in the moire evaluation, and the visibility of the moire is further suppressed in these examples.

In the second modification of the first embodiment, since the thin conductive wires ML1, ML2, ML3, ML4, ML5, ML6 and ML7 each include the thin wire piece Ub that satisfies the second condition, a periodicity of the bright and dark pattern tends to be short to a degree that a human cannot recognize. For example, the thin wire piece Ub extends in a direction having an angle with respect to the pixel orthogonal direction Dx and the pixel array direction Dy. When the second condition is satisfied, the angle is equal to or larger than a certain value, and thus the periodicity in the bright and dark pattern tends to be short. As a result, the thin conductive wires ML1, ML2, ML3, ML4, ML5, ML6 and ML7 each include the thin wire piece Ub that satisfies the second condition, thereby lowering the possibility that the moire is visible. When the thin wire piece Ua and the thin wire piece Ub satisfy the second condition, the possibility that the moire is visible can be lowered.

The thin wire piece Ub extends in a direction having an angle with respect to the pixel array direction Dy, and a tangent of the angle is in a range of values larger than a value obtained by dividing the first unit length Lx2 by twice the second unit length Ly2, and smaller than a value obtained by dividing twice the first unit length Lx2 by the second unit length Ly2, and is different from a value obtained by dividing the first unit length Lx2 by the second unit length Ly2. Thus, the angle of the extending direction of the thin wire piece Ub formed with respect to the pixel orthogonal direction Dx or the pixel array direction Dy is equal to or larger than the certain value, and the periodicity of the bright and dark pattern tends to be short. As a result, the display device with a touch detection function 10 according to the second modification of the first embodiment is capable of lowering the possibility that the moire is visible.

Second Embodiment

Figure 18:
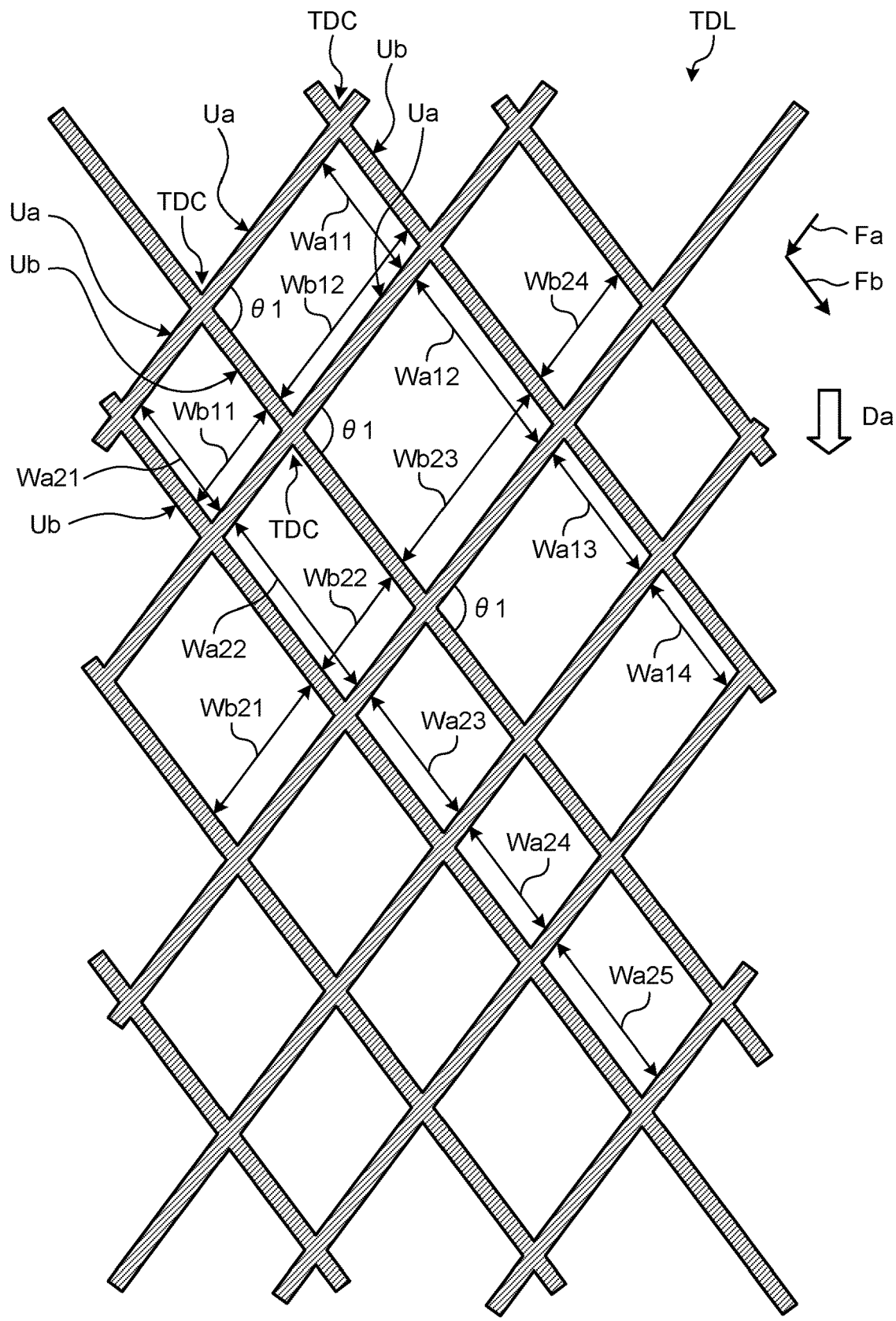
FIG. 18 is a schematic diagram illustrating arrangement of a detection electrode according to a second embodiment.

FIG. 18 is a schematic diagram illustrating a part of arrangement of a detection electrode according to a second embodiment. The detection electrode TDL according to the second embodiment includes the thin wire pieces Ua and the thin wire pieces Ub which extend so as to have parts where the coupling portions are connected to one another as intersections on a plane parallel to the counter substrate 3. The thin wire piece Ua extends in the first direction Fa, and the thin wire piece Ub extends in the second direction Fb. The extending directions of the thin wire pieces Ua and Ub are different from each other. The thin wire piece Ua is interposed between the coupling portions TDC. Similarly, the thin wire piece Ub is interposed between the coupling portions TDC. In other words, the detection electrode TDL according to the second embodiment includes mesh-like thin conductive wires that have a zigzag shape or a waveform and that are folded at the coupling portions. In the second embodiment, the dummy electrode is not described, but the dummy electrode may be provided similarly to the first embodiment. The same reference numerals are denoted for the same constituent components as those described in the first embodiment, and the detailed description thereof will be omitted.

Since the thin wire pieces Ua extend in parallel to one another and the thin wire pieces Ub also extend in parallel to one another, the thin wire pieces Ua and Ub intersect with each other forming an angle θ1 therebetween.

A distance Wa11 between a thin wire piece Ua and its adjacent thin wire piece Ua is different from a distance Wa12 between the adjacent thin wire piece Ua and another thin wire piece Ua adjacent to the adjacent thin wire piece Ua. The distance between the adjacent two thin wire pieces Ua is not constant in the second direction Fb as can be seen from the distance Wa11, the distance Wa12, a distance Wa13, and a distance Wa14.

Similarly, a distance Wa21 between a thin wire piece Ua and its adjacent thin wire piece Ua is different from a distance Wa22 between the adjacent thin wire piece Ua and another thin wire piece Ua adjacent to the adjacent thin wire piece Ua. The distance between the adjacent two thin wire pieces Ua is not constant in the second direction Fb as can be seen from the distance Wa21, the distance Wa22, a distance Wa23, a distance Wa24, and a distance Wa25. Further, the distance between the adjacent two thin wire pieces Ua is not regular but is a random value in the second direction Fb as described above.

A distance Wb11 between a thin wire piece Ub and its adjacent thin wire piece Ub is different from a distance Wb12 between the adjacent thin wire piece Ub and another thin wire piece Ub adjacent to the adjacent thin wire piece Ub. A distance between the two adjacent thin wire pieces Ub is not constant in the first direction Fa as can be seen from the distance Wb11 and the distance Wb12.

Similarly, a distance Wb21 between a thin wire piece Ub and its adjacent thin wire piece Ub is different from a distance Wb22 between the adjacent thin wire piece Ub and another thin wire piece Ub adjacent to the adjacent thin wire piece Ub. The distance between the adjacent two thin wire pieces Ub is not constant in the first direction Fa as can be seen from the distance Wb21 and the distance Wb22, a distance Wb23, and a distance Wb24. As described above, the distance between the adjacent two thin wire pieces Ub is not regular but is a random value in the first direction Fa.

Similarly to the first embodiment, the bright and dark pattern becomes hard to have a periodicity, thereby lowering the possibility that the moire is visible in the second embodiment. In the second embodiment, the angle θ1 formed between the adjacent thin wire piece a and thin wire piece b is constant. Thus, when the visible light is incident on the detection electrodes TDL, the light intensity pattern in which light is diffracted or scattered by the detection electrodes TDL becomes hard to spread. Thus, the light intensity pattern tends to gather in four directions, and a constant directivity is likely to appear. Further, when a viewer directly tilts the detection device according to the second embodiment, it becomes easy to avoid forming an angle by which the light intensity pattern tends to appear. As a result, the light intensity pattern in which light is diffracted or scattered by the detection electrodes TDL becomes hard to be visible.

First Modification of Second Embodiment

Figure 19:
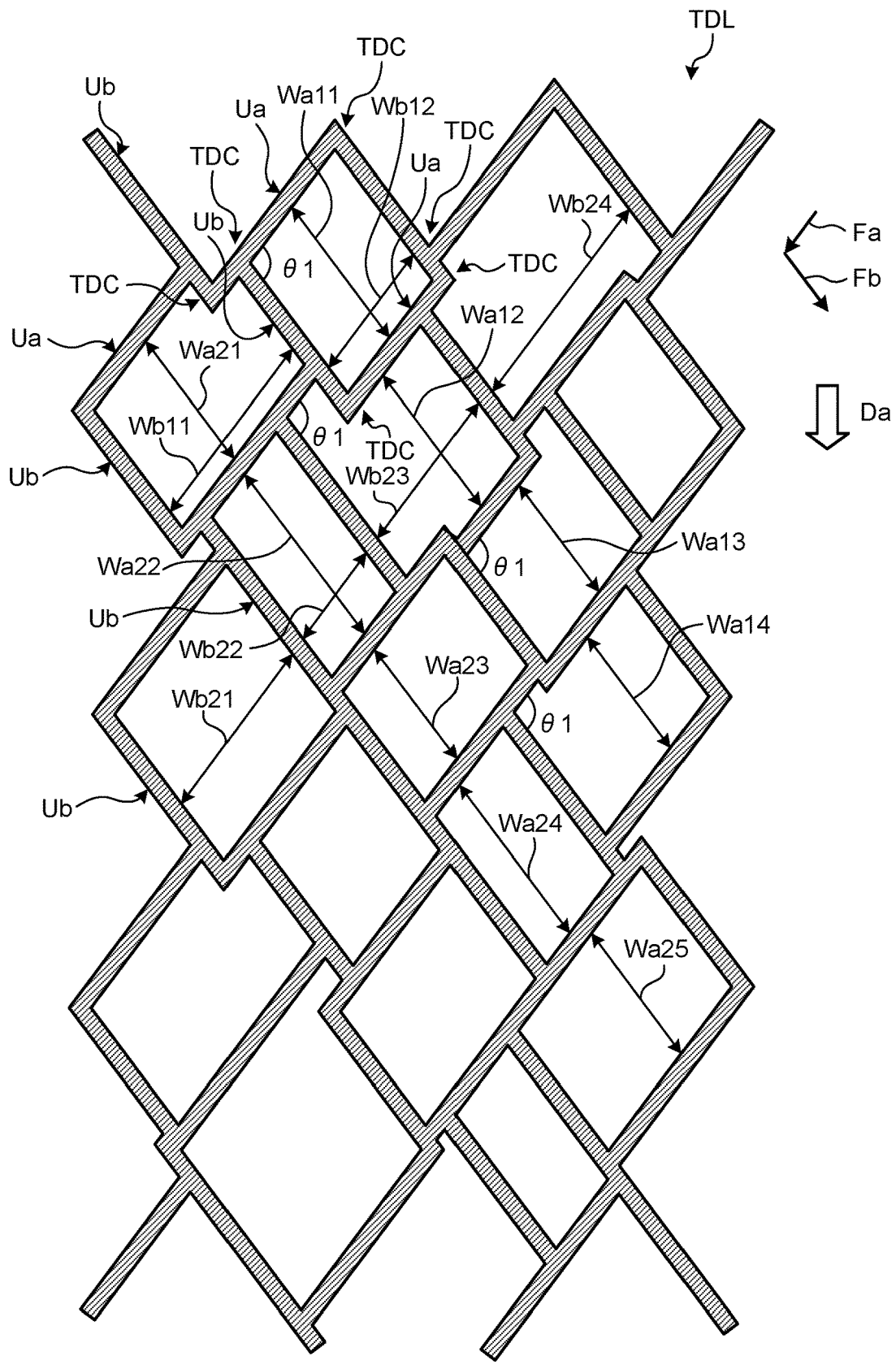
FIG. 19 is a schematic diagram illustrating a part of arrangement of a detection electrode according to a first modification of the second embodiment.

FIG. 19 is a schematic diagram illustrating a part of arrangement of a detection electrode according to a first modification of the second embodiment. The same reference numerals are denoted for the same constituent components as those described in the above-described first and second embodiments, and the detailed description thereof will be omitted.

The distance Wa11 and the distance Wa21 are the same in the second embodiment, but a distance Wa11 and a distance Wa22 are different from each other in the first modification of the second embodiment. The distance Wb11 and the distance Wb22 are the same in the second embodiment, but a distance Wb11 and a distance Wb21 are different from each other in the first modification of the second embodiment. In this manner, a distance between the two adjacent thin wire pieces Ua is not constant in the second direction Fb. A distance between the two adjacent thin wire pieces Ub is not constant in the first direction Fa.

The detection electrode according to the first modification of the second embodiment achieves the same effects as the detection electrode TDL according to the second embodiment.

Second Modification of Second Embodiment

Figure 20:
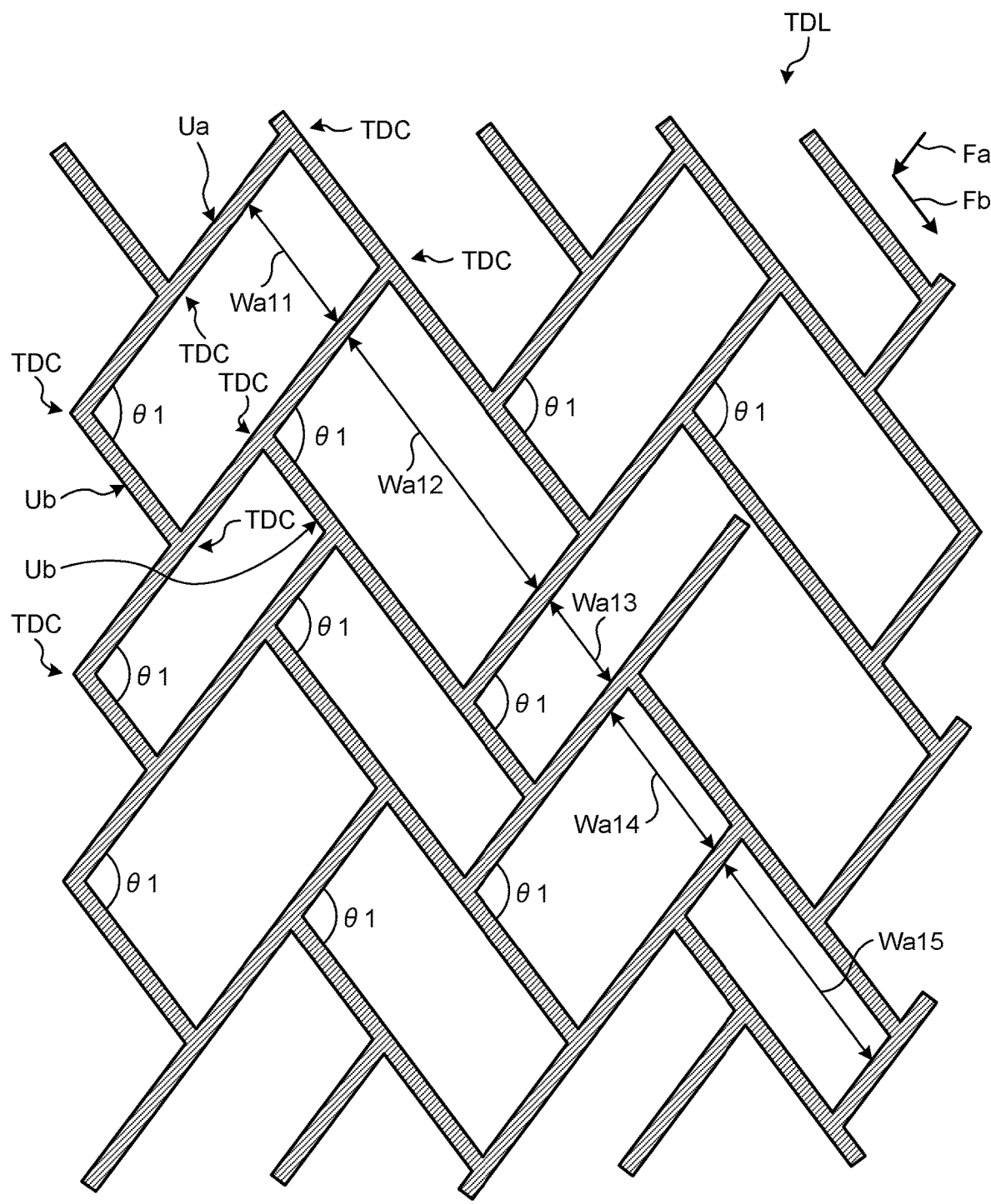
FIG. 20 is a schematic diagram illustrating a part of arrangement of a detection electrode according to a second modification of the second embodiment.

FIG. 20 is a schematic diagram illustrating a part of arrangement of a detection electrode according to a second modification of the second embodiment. The same reference numerals are denoted for the same constituent components as those described in the above-described first and second embodiments, and the detailed description thereof will be omitted.

In the detection electrode TDL according to the second embodiment, the number of the thin wire pieces Ua arranged in the second direction Fb is the same regardless of a position, but in the second modification of the second embodiment, the number of the thin wire pieces Ua arranged in the second direction Fb is different depending on a position. In this manner, a distance between the two adjacent thin wire pieces Ua is not constant in the second direction Fb. The distance between the adjacent two thin wire pieces Ub is not constant in the first direction Fa.

The detection electrode TDL according to the second modification of the second embodiment achieves the same effects as the detection electrode TDL according to the second embodiment.

As illustrated in FIG. 20, the thin wire piece Ua may have a part that is not coupled to the thin wire piece Ub in the detection electrode according to the second modification of the second embodiment.

Third Embodiment

Figure 21:
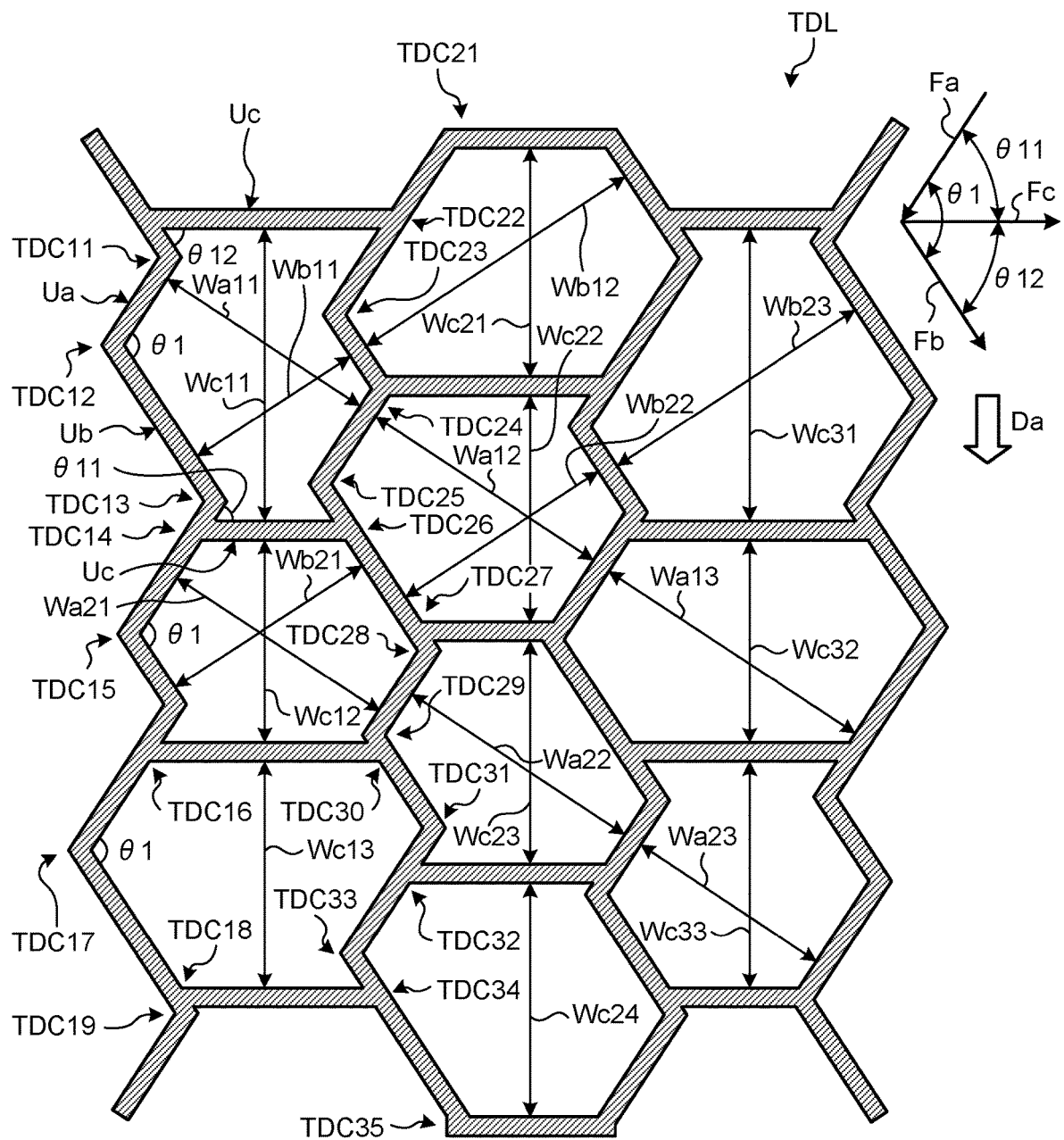
FIG. 21 is a schematic diagram illustrating a part of arrangement of a detection electrode according to a third embodiment.

FIG. 21 is a schematic diagram illustrating a part of arrangement of a detection electrode according to a third embodiment. The detection electrode TDL according to the third embodiment includes the thin wire pieces Ua, the thin wire pieces Ub and thin wire pieces Uc, which extend so as to have parts where the coupling portions are connected to one another, on a plane parallel to the counter substrate 3. The thin wire piece Ua extends in the first direction Fa, and the thin wire piece Ub extends in the second direction Fb. The thin wire piece Uc extends in a third direction Fc. The extending directions of the thin wire pieces Ua and Ub are different from each other. The extending direction of the thin wire piece Uc is different from the extending directions of the thin wire pieces Ua and Ub. Each of the thin wire pieces Ua and the thin wire pieces Ub is interposed among coupling portions TDC11, TDC12, TDC13, TDC15, TDC17 and TDC18. In other words, the detection electrode TDL according to the third embodiment includes the thin conductive wires that have a zigzag shape or a waveform formed by the thin wire pieces Ua and the thin wire pieces Ub and that are folded at any one of the coupling portions TDC11, TDC12, TDC13, TDC15, TDC17 and TDC18. Similarly, each of the thin wire pieces Ua and the thin wire pieces Ub is interposed among coupling portions TDC21, TDC23, TDC24, TDC25, TDC28, TDC29, TDC31 and TDC33. In the third embodiment, the dummy electrode is not described, but the dummy electrode may be provided similarly to the first embodiment. The same reference numerals are denoted for the same constituent components as those described in the above-described first and second embodiments, and the detailed description thereof will be omitted.

Since the thin wire pieces Ua extend in parallel to one another, and the thin wire pieces Ub also extend in parallel to one another, the thin wire piece Ua and the thin wire piece Ub intersect with each other forming an angle θ1 there.

A distance Wa11 between a thin wire piece Ua and its adjacent thin wire piece Ua is different from a distance Wa12 between the adjacent thin wire piece Ua and another thin wire piece Ua adjacent to the adjacent thin wire piece Ua. The distance between the adjacent two thin wire pieces Ua is not constant in the second direction Fb as can be seen from the distance Wa11, the distance Wa12, and a distance Wa13.

Similarly, a distance Wa21 between a thin wire piece Ua and its adjacent thin wire piece Ua is different from a distance Wa22 between the adjacent thin wire piece Ua and another thin wire piece Ua adjacent to the adjacent thin wire piece Ua. The distance between the adjacent two thin wire pieces Ua is not constant in the second direction Fb as can be seen from the distance Wa21, the distance Wa22, and a distance Wa23.

A distance Wb11 between a thin wire piece Ub and its adjacent thin wire piece Ub is different from a distance Wb12 between the adjacent thin wire piece Ub and another thin wire piece Ub adjacent to the thin wire piece Ua. The distance between the adjacent two thin wire pieces Ub is not constant in the first direction Fa as can be seen from the distance Wb11 and the distance Wb12.

Similarly, a distance Wb21 between a thin wire piece Ub and its adjacent thin wire piece Ub is different from a distance Wb22 between the adjacent thin wire piece Ub and another thin wire piece Ub adjacent to the adjacent thin wire piece Ub. The distance between the adjacent two thin wire pieces Ub is not constant in the first direction Fa as can be seen from the distance Wb21 and the distance Wb22, and a distance Wb23.

A distance Wc11 between a thin wire piece Uc and its adjacent thin wire piece Uc thereof is different from a distance Wc12 between the adjacent thin wire piece Uc and another thin wire piece Uc adjacent to the adjacent thin wire piece Uc. The distance between the adjacent two thin wire pieces Uc is not constant in the direction Da as can be seen from the distance Wc11, the distance Wc12 and a distance Wc13.

Similarly, a distance Wc21 between a thin wire piece Uc and its adjacent thin wire piece Uc is different from a distance Wc22 between the adjacent thin wire piece Uc and another thin wire piece Uc adjacent to the adjacent thin wire piece Uc. The distance between the adjacent two thin wire pieces Uc is not constant in the direction Da as can be seen from the distance Wc21, the distance Wc22, a distance Wc23, and a distance Wc24.

Similarly, a distance Wc31 between a thin wire piece Uc and its adjacent thin wire piece Uc is different from a distance Wc32 between the adjacent thin wire piece Uc and another thin wire piece Uc adjacent to the adjacent thin wire piece Uc. The distance between the adjacent two thin wire pieces Uc is not constant in the direction Da like the distance Wc31, the distance Wc32 and a distance Wc33.

Similarly to the first embodiment, the bright and dark pattern becomes hard to have a periodicity, thereby lowering the possibility that the moire is visible in the third embodiment. In the third embodiment, angles θ1, θ11, θ12 each of which is formed between the adjacent thin wire piece Ua and thin wire piece Ub are constant. Thus, when the visible light is incident on the detection electrodes TDL, the light intensity pattern in which light is diffracted or scattered by the detection electrodes TDL becomes hard to spread. Thus, the light intensity pattern tends to gather in six directions, and a constant directivity is likely to appear. Further, when a viewer directly tilts the detection device according to the third embodiment, it becomes easy to avoid forming an angle by which the light intensity pattern tends to appear. As a result, the light intensity pattern in which light is diffracted or scattered by the detection electrodes TDL becomes hard to be visible.

First Modification of Third Embodiment

Figure 22:
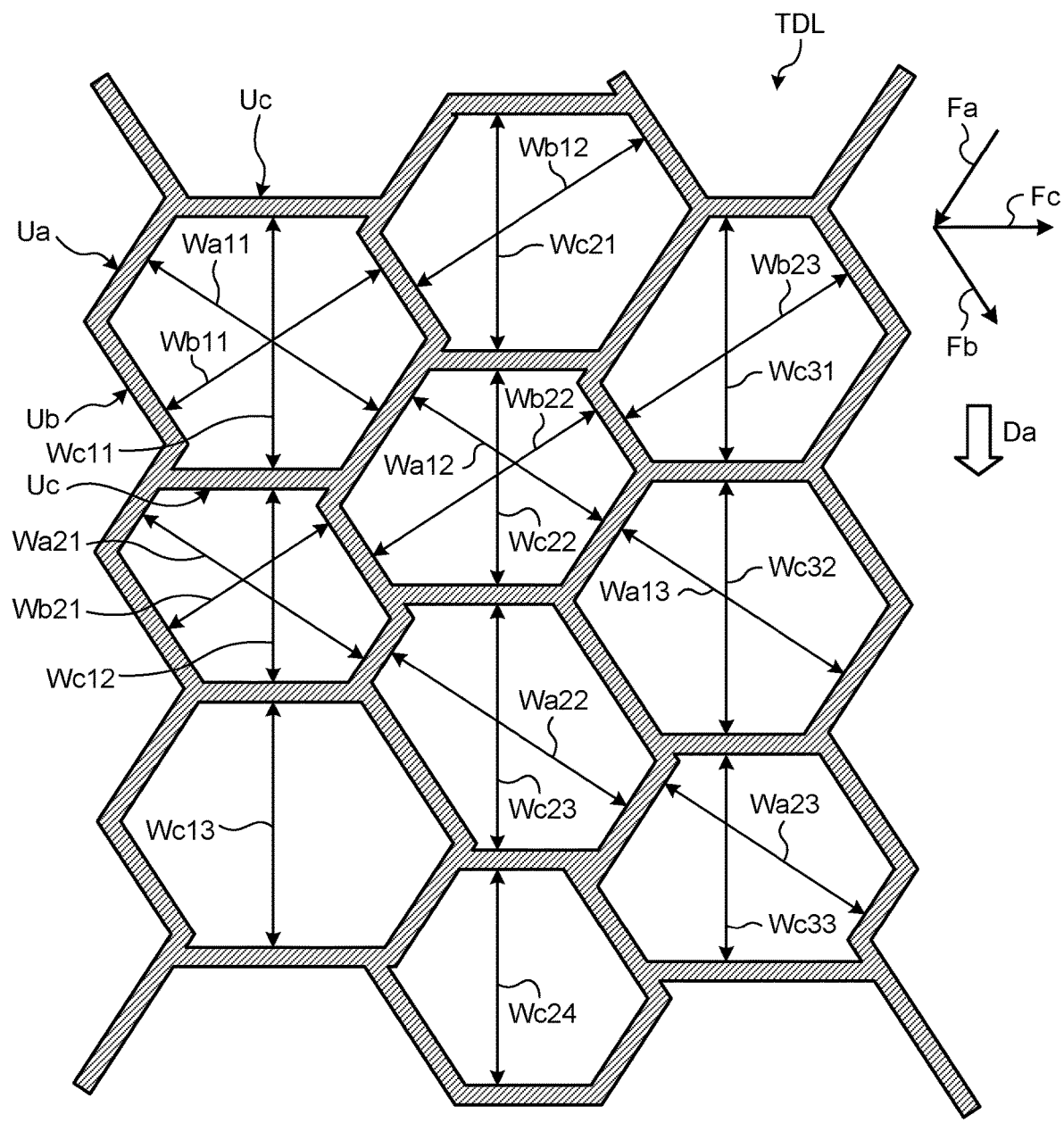
FIG. 22 is a schematic diagram illustrating a part of arrangement of a detection electrode according to a first modification of the third embodiment.

FIG. 22 is a schematic diagram illustrating a part of arrangement of a detection electrode according to a first modification of the third embodiment. The same reference numerals are denoted for the same constituent components as those described in the above-described first and second embodiments, and the detailed description thereof will be omitted.

In the detection electrode according to the third embodiment, different thin wire pieces Uc are arranged on one straight line in the third direction Fc, but in the detection electrode according to the first modification of the third embodiment, different thin wire pieces Uc are not arranged on a single straight line in the third direction Fc.

The detection electrode according to the first modification of the third embodiment achieves the same effects as the detection electrode TDL according to the second embodiment.

Fourth Embodiment

Figure 23:
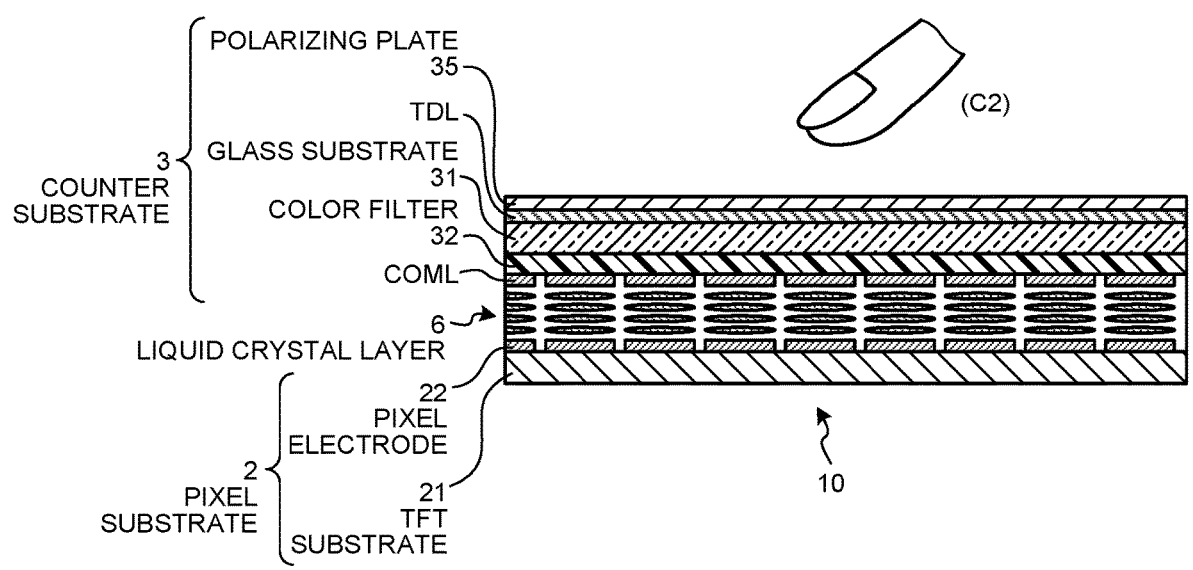
FIG. 23 is a cross-sectional view illustrating a schematic cross-sectional structure of a display device with a touch detection function according to a fourth embodiment.

FIG. 23 is a cross-sectional view illustrating a schematic cross-sectional structure of a display device with a touch detection function according to a fourth embodiment. In the first to third embodiments and the modifications thereof described above, the display device with a touch detection function 10 is configured such that the liquid crystal display device 20 that employs a liquid crystal of various modes such as FFS and IPS, and the detection device 30 are integrated with each other. Alternatively, the display device with a touch detection function 10 according to the fourth embodiment illustrated in FIG. 23 may be configured such that a liquid crystal of various modes such as twisted nematic (TN), vertical alignment (VA), and electrically controlled birefringence (ECB), and a touch detection device are integrated with each other.

The preferred embodiments of the present invention have been described above, but the present invention is not limited to those embodiments. The content disclosed in the embodiments is mere exemplary, and various modifications can be made within a range of not departing from the gist of the present invention. The appropriate modifications made within the range of not departing from the gist of the present invention also belong to the technical range of the present invention.

Figure 24:
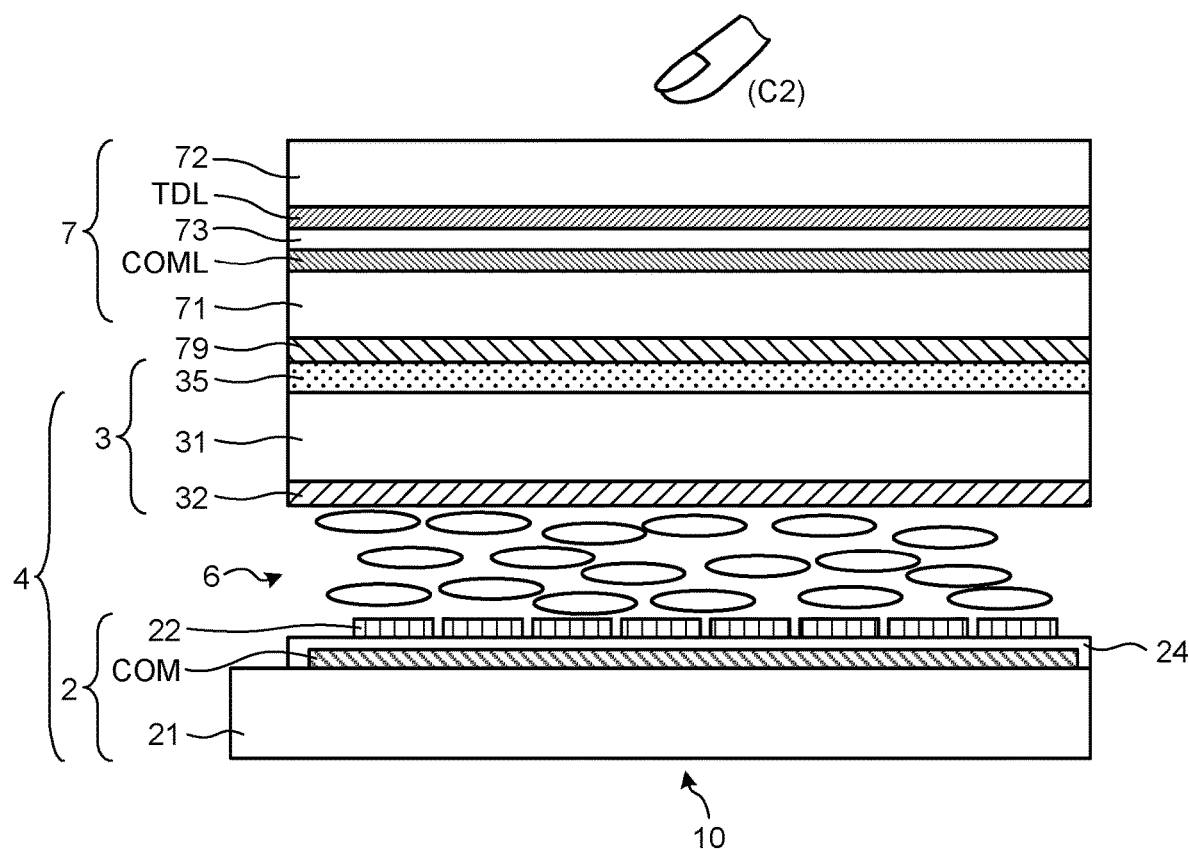
FIG. 24 is a cross-sectional view illustrating a schematic cross-sectional structure of a display device with a touch detection function according to a first modification of the fourth embodiment.

FIG. 24 is a cross-sectional view illustrating a schematic cross-sectional structure of a display device with a touch detection function according to a first modification of the fourth embodiment. As illustrated in FIG. 24, a display device 4 is provided with a so-called common electrode COM instead of the detection electrode TDL and the drive electrode COML. A detection device 7 is provided with the drive electrode COML extending on a plane parallel to a surface of a third substrate 71, and the detection electrode TDL extending on a surface of a fourth substrate 72. The third substrate 71 and the fourth substrate 72 are bonded to each other by an optical adhesive layer 73 or the like such that the detection electrode TDL and the drive electrode COML oppose each other. The detection device 7 overlaps with the display device 4 in a direction perpendicular to the fourth substrate 72, and is fixed by an optical adhesive layer 79 or the like. Accordingly, the above-described display area Ad and the detection electrode TDL are overlapped with each other in the direction perpendicular to the fourth substrate 72

Figure 25:
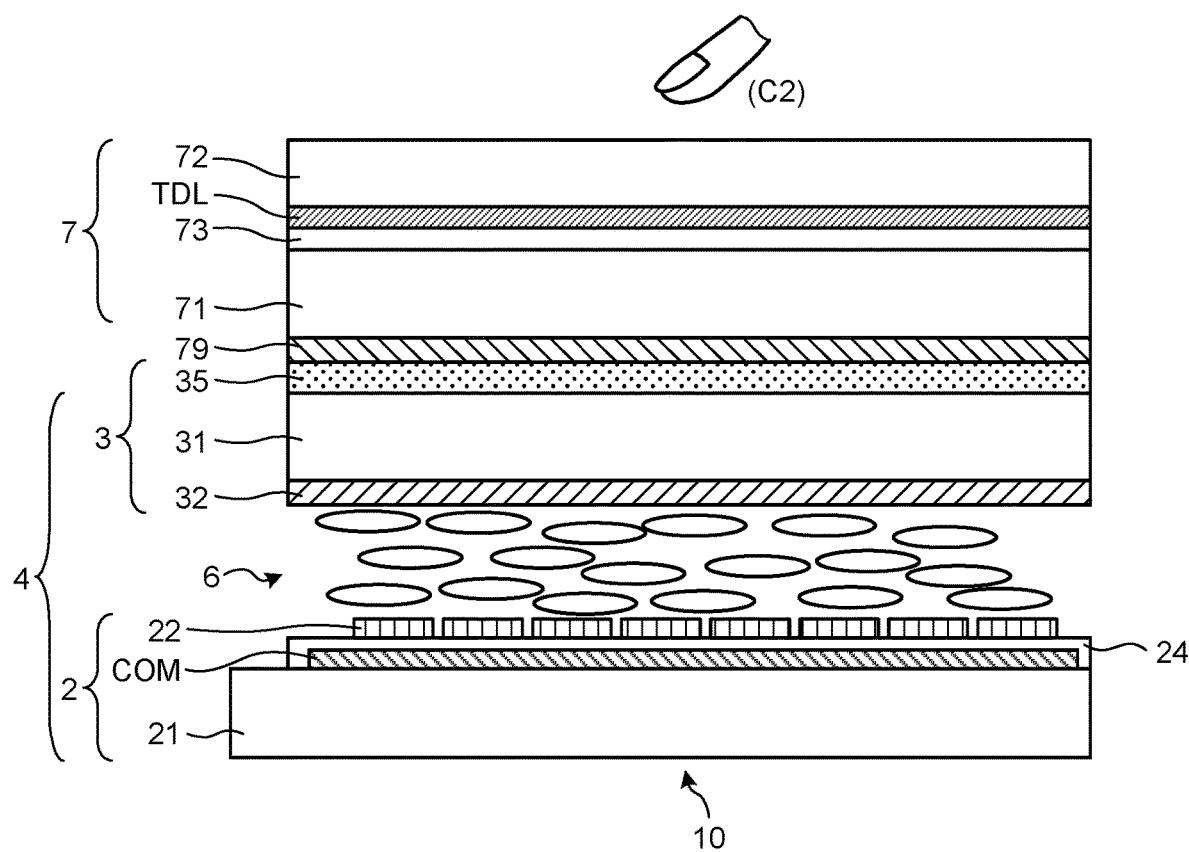
FIG. 25 is a cross-sectional view illustrating a schematic cross-sectional structure of a display device with a touch detection function according to a second modification of the fourth embodiment.

FIG. 25 is a cross-sectional view illustrating a schematic cross-sectional structure of a display device with a touch detection function according to a second modification of the fourth embodiment. As illustrated in FIG. 25, the display device 4 is provided with the so-called common electrode COM instead of the detection electrode TDL and the drive electrode COML. The detection device 7 does not include the drive electrode COML extending on the plane parallel to the surface of the third substrate 71, but only includes the detection electrode TDL extending on the surface of the fourth substrate 72. The third substrate 71 and the fourth substrate 72 are bonded to each other by the optical adhesive layer 73 or the like so as to protect the detection electrode TDL. The detection device 7 overlaps with the display device 4 in the direction perpendicular to the fourth substrate 72, and is fixed by the optical adhesive layer 79 or the like. Accordingly, the above-described display area Ad and the detection electrode TDL overlap with each other in the direction perpendicular to the fourth substrate 72. The above-described touch detection unit 40 detects the change in the self-capacitance of only the detection electrode TDL. The detection electrode TDL does not include the drive electrode COML, and the potential difference is not generated therein, and thus, corrosion and/or migration of metal hardly occurs.

The detection electrodes TDL may be evenly arranged evenly like a plurality of islands. In this case, each of the detection electrodes TDL is electrically conducted with the touch detection unit 40. Further, positions of the island-like detection electrodes TDL in which there occurs the contact state or proximity state by the external proximity object is detected by the touch detection unit 40 using the change in the self-capacitance. The detection electrodes TDL extending on the surface of the fourth substrate 72 have a double-layered structure in which the detection electrodes TDL oppose each other with an insulating layer interposed therebetween, and may be configured such that the respective detection electrodes TDL extend in two different directions. In this case, the touch detection unit 40 detects the change in the self-capacitance at an intersection, when seen in the plane view, between the detection electrodes TDL extending in the two different directions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A detection device capable of detecting an external proximity object, the detection device comprising:
   a substrate; and
   a plurality of thin conductive wires including: a plurality of first thin conductive wires each including a plurality of first thin wire pieces; and a plurality of second thin conductive wires each including a plurality of second thin wire pieces, the first thin wire pieces and the second thin wire pieces being made of a metal material and each including a first end portion and a second end portion, wherein
   each of the first thin conductive wires is formed as a straight line by connecting the second end portion of one first thin wire piece and the first end portion of another first thin wire piece adjacent to the one first thin wire piece, and each of the second thin conductive wires is formed as a straight line by connecting the second end portion of one second thin wire piece and the first end portion of another second thin wire piece adjacent to the one second thin wire piece,
   the first thin conductive wires extend in a first direction and are arrayed in a second direction different from the first direction, and the second thin conductive wires extend in the second direction and are arrayed in the first direction,
   the first thin conductive wires and the second thin conductive wires intersect each other at coupling portions so as to form a plurality of quadrilaterals and be electrically coupled to each other,
   the quadrilaterals include:
      a first quadrilateral;
      a second quadrilateral adjacent to the first quadrilateral, one side of the second quadrilateral being shared by a first side of the first quadrilateral;
      a third quadrilateral adjacent to the first quadrilateral, one side of the third quadrilateral being shared by a second side of the first quadrilateral;
      a fourth quadrilateral adjacent to the first quadrilateral, one side of the fourth quadrilateral being shared by a third side of the first quadrilateral; and
      a fifth quadrilateral adjacent to the first quadrilateral, one side of the fifth quadrilateral being shared by a fourth side of the first quadrilateral, and
   the first quadrilateral has a larger area than an area of the second quadrilateral, an area of the third quadrilateral, an area of the fourth quadrilateral, and an area of the fifth quadrilateral.

2. The detection device according to claim 1, wherein the quadrilaterals further include:
   a six quadrilateral adjacent to the first quadrilateral, one apex of the six quadrilateral being shared by a first apex of the first quadrilateral;
   a seven quadrilateral adjacent to the first quadrilateral, one apex of the seven quadrilateral being shared by a second apex of the first quadrilateral;
   an eighth quadrilateral adjacent to the first quadrilateral, one apex of the eighth quadrilateral being shared by a third apex of the first quadrilateral; and
   a ninth quadrilateral adjacent to the first quadrilateral, one apex of the ninth quadrilateral being shared by a fourth apex of the first quadrilateral, and
   two sides of each of the six quadrilateral, the seven quadrilateral, the eighth quadrilateral, and the ninth quadrilateral are shared by two of one side of the second quadrilateral, one side of the third quadrilateral, one side of the fourth quadrilateral, and one side of the fifth quadrilateral.

3. The detection device according to claim 1, wherein the area of the second quadrilateral, the area of the third quadrilateral, the area of the fourth quadrilateral, and the area of the fifth quadrilateral are different from one another.

4. The detection device according to claim 1, wherein the area of the second quadrilateral, the area of the third quadrilateral, the area of the fourth quadrilateral, and the area of the fifth quadrilateral are identical.

5. The detection device according to claim 1, wherein
   the first thin conductive wires are arrayed in parallel to one another in the second direction, and the second thin conductive wires are arrayed in parallel to one another in the first direction, and
   an angle formed by an intersection between each of the first thin wire pieces and each of the second thin wire pieces is constant in an identical direction.

6. The detection device according to claim 5, wherein all angles formed by intersections between the respective first thin wire pieces and the respective second thin wire pieces are constant in the identical direction.

7. The detection device according to claim 5, wherein a distance between adjacent first thin wire pieces of different first thin conductive wires is not constant.

8. The detection device according to claim 7, wherein in the adjacent first thin wire pieces of the different first thin conductive wires, a length of a straight line connecting the first end portion of each of the first thin wire pieces and the second end portion of each of the first thin wire pieces is not constant.

9. The detection device according to claim 5, wherein a distance between adjacent second thin wire pieces of different second thin conductive wires is not constant.

10. The detection device according to claim 9, wherein in the adjacent second thin wire pieces of the different second thin conductive wires, a length of a straight line connecting the first end portion of each of the second thin wire pieces and the second end portion of each of the second thin wire pieces is not constant.

11. The detection device according to claim 1, further comprising
   a plurality of drive electrodes that form capacitance with detection electrodes including the plurality of thin conductive wires and apply a drive signal.

12. The detection device according to claim 1, wherein a change in self-capacitance only in a detection electrode including the plurality of thin conductive wires is detected.

* * * * *